United States Patent

Paull et al.

[11] Patent Number: 5,945,981
[45] Date of Patent: Aug. 31, 1999

[54] WIRELESS INPUT DEVICE, FOR USE WITH A COMPUTER, EMPLOYING A MOVABLE LIGHT-EMITTING ELEMENT AND A STATIONARY LIGHT-RECEIVING ELEMENT

[75] Inventors: Mike M. Paull; Russell I. Sanchez, both of Seattle; Mark K. Svancarek, Redmond, all of Wash.; Tetsuji Aoyagi, Kanagawa, Japan

[73] Assignee: Microsoft Corporation, Redmond, Wash.

[21] Appl. No.: 08/901,878

[22] Filed: Jul. 29, 1997

Related U.S. Application Data

[63] Continuation of application No. 08/153,468, Nov. 17, 1993, abandoned.

[51] Int. Cl.$^6$ .................................................. G09G 1/00
[52] U.S. Cl. ........................................ 345/180; 345/158
[58] Field of Search .................................. 345/156, 157, 345/158, 175, 176, 179, 180, 182, 166; 250/221; 178/18.01, 18.03, 18.1, 18.09, 19.01; 341/20, 21

[56] References Cited

U.S. PATENT DOCUMENTS

| | | |
|---|---|---|
| 4,550,250 | 10/1985 | Mueller et al. . |
| 4,565,999 | 1/1986 | King et al. .............................. 345/158 |
| 4,682,159 | 7/1987 | Davison . |
| 4,688,933 | 8/1987 | Lapeyre . |
| 4,707,689 | 11/1987 | DiPiazza et al. ........................ 345/175 |
| 4,949,080 | 8/1990 | Mikan . |
| 5,045,843 | 9/1991 | Hansen . |
| 5,166,668 | 11/1992 | Aoyagi . |
| 5,227,622 | 7/1993 | Suzuki .................................... 250/221 |
| 5,297,061 | 3/1994 | Dementhon et al. ................... 345/180 |
| 5,298,737 | 3/1994 | Proper .................................... 250/221 |

FOREIGN PATENT DOCUMENTS

| | | | |
|---|---|---|---|
| 0 202 468 | 11/1986 | European Pat. Off. | ....... G06K 11/06 |
| 0 372 674 | 6/1990 | European Pat. Off. | ....... G06K 11/08 |
| 2 263 546 | 7/1993 | United Kingdom | ............ G01B 11/03 |

OTHER PUBLICATIONS

"The DynaSight™ Sensor Developer's Kit", Origin Instruments Corp., Grand Prairie, Texas, 1992, and photoreproduction of same.
Freepoint~ Cordless Pen Mouse Brochure, Data Stream Corporation, Singapore, Nov. 1992.
Freepoint™ Reference Guide, Version 1.0, Data Stream Corp., Singapore, Ed. 1, 1992.
Photoreproductions of various commericially available computer stylus designs (2 pages).
Welch, Nathalie, "Hawkeye zooms in on Mac screens with wireless infrared penlight pointer", 1993, with photoreproduction of same.
Hawkeye Product Brochure, Pointer Systems, Inc., Burlington, VT, 1993.
"AT&T seeks role in pen computing", *Journal American*, Aug. 16, 1993.

*Primary Examiner*—Chanh Nguyen
*Attorney, Agent, or Firm*—Seed and Berry LLP

[57] ABSTRACT

The wireless computer input system uses a pen-type input device and a receiver. The pen-type input device includes an LED, at least one switch, a rechargeable battery, and a control circuit. The control circuit provides signals to the LED upon activation of the switch, and provides for power management functions allowing the pen to conserve power during idle periods. The receiver includes one or more light-detecting elements connected to position computation circuitry. The light-detecting element or elements are either a two-dimensional PSD, two one-dimensional PSDs or a four division photodiode. Optional lenses, optical filters, and apertured plates are positioned before the light-detecting element(s), improving the signal-to-noise ratio of the system. The computation circuitry receives the signals from the light-detecting element(s), digitizes them, and computes the coordinates of the pen which are output to a host computer. A recharging circuit, connected to the computation circuit, allows the pen to be recharged within the receiver or connected by a cord when the battery lacks sufficient power.

50 Claims, 12 Drawing Sheets

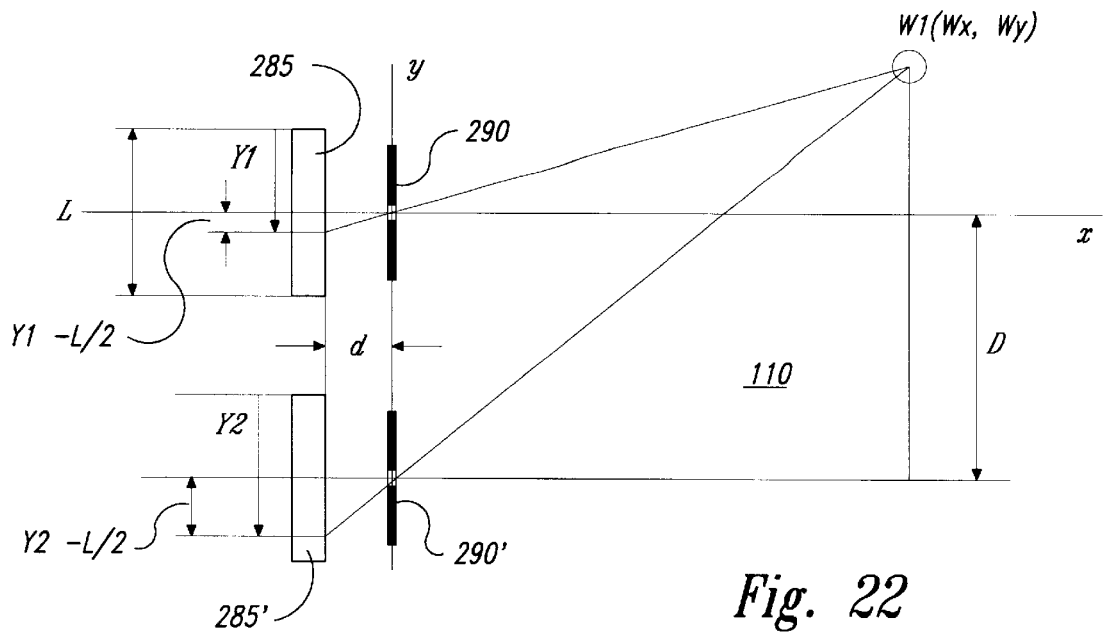
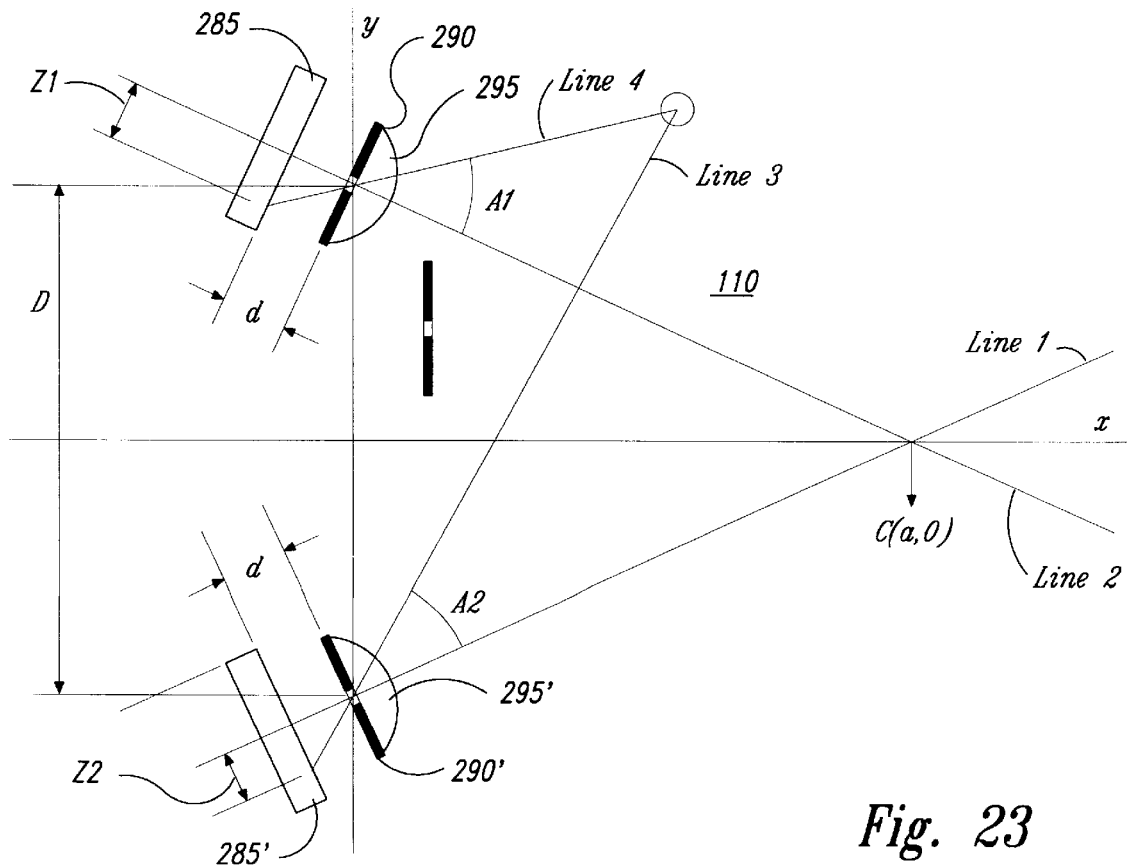
Fig. 22
Fig. 23

WIRELESS INPUT DEVICE, FOR USE WITH A COMPUTER, EMPLOYING A MOVABLE LIGHT-EMITTING ELEMENT AND A STATIONARY LIGHT-RECEIVING ELEMENT

CROSS-REFERENCE TO RELATED APPLICATION

This application is a continuation of U.S patent application Ser. No. 08/153,468, filed Nov. 17, 1993, now abandoned.

TECHNICAL FIELD

This invention relates to wireless computer input systems.

BACKGROUND OF THE INVENTION

The computer industry is currently striving to make computers and computer application programs more "user-friendly." Many user-friendly computer application programs permit users to input commands via a graphical user interface, e.g., a screen displaying various options in graphical format. Software programs using the WINDOWS™ environment, manufactured by Microsoft Corporation, often take advantage of the user-friendly interface permitted under this environment, by allowing users to enter commands by moving a cursor or pointer on the computer screen to select various options or move through windows.

In today's computers, cursor movement is often controlled using input devices such as mice or trackballs. These input devices also allow selection of options and navigation through windows and menus, however, are unsuitable for applications requiring high resolution computer input such as drawing, inking, gesturing, recognition and absolute positioning. Another drawback of mice and trackballs are that they are attached to the computer by a cord. At times, this cord can be annoying or a hindrance.

Pen and tablet and other similar digitizing computer input devices permit high resolution input. However, these input devices are not readily suited for cursor control, selection of options and navigation through windows and applications. Another drawback of pen and tablet input devices are that they require a special digitizing tablet upon which to move the pen. This tablet is often bulky and unsuitable in some working environments.

U.S. Pat. No. 5,166,668 describes a wireless computer input system using a battery-powered pen-type input device having a light emitting element at its tip. Light generated by a light-emitting diode in a pen is received by an input unit. The input unit detects and calculates the pen's position and outputs the position coordinates to a computer. The pen must be moved within a small area proximate to the input unit. The input unit has two sets of optical elements each having: a lens, an optical detector, and an optical filter. The optical detector is described as a two-division photodiode which detects a ratio of light impinging on both halves of the detector.

The system described in the above patent relies on two-division photodiodes. Two-division photodiodes require both halves to be tuned to provide equal outputs in response to an equal amount of impinging light, i.e., the two divisions must be identical. Such photodiodes are expensive to produce and may suffer from less than optimal resolution. The incident light spot must be large enough to impinge on both halves of the photodiode, and with enough energy, to produce ample current at the output terminals. Therefore, the photodiode output is dependent on the amount of incident light received. This often requires the light emitting element to produce a large amount of light, quickly draining the pen's battery during frequent use.

U.S. Pat. No. 5,045,843 describes another computer input system using a moveable, wireless remote unit and a stationary input unit, both transmitting signals between each other. The remote unit contains a light emitting element, a light detector, a switch, a power supply, and a controller. The stationary input unit contains a light emitting element, a photo detector, an amplifier, and a processor.

One problem with the system described in this patent is that the light detector and associated circuitry are included in a large and cumbersome wireless remote unit. The light detector is placed at the end of a long tube, forming a camera-type receiver. The receiver, and the system as a whole, would be expensive to manufacture because of the many and costly components necessary to operate the invention. Another problem is that the remote unit must be moved in a large area, and would be unsuitable for small, detailed and accurate movements on a small work surface. The remote unit is used primarily to move a cursor on a television screen at a substantial distance (several feet) from the television. Consequently, this system cannot be used for inking, gesturing, or character recognition, because these functions require precision recognition of a user's small hand movements.

SUMMARY OF THE INVENTION

According to principles of the present invention, a pen-type input device having a light-emitting element, preferably a light emitting diode (LED), emits light pulses. The pulses are received by a stationary receiver having one or more light-detecting elements, preferably position sensing devices (PSDs). The receiver has an optical receiver positioned at a selected height and angle over a surface. As the pen is moved on the surface, the optical receiver is positioned to receive the light pulses as a a spot of light on the PSD and produce output signals corresponding to the position of the light spot on the PSD. Alternatively, the pen may be moved in open space before the receiver, producing similar signals.

The pen includes the LED, a rechargeable power supply and at least one switch, all interconnected by a control circuit. The control circuit includes a power conservation circuit for reducing the power drain on the power supply. The power conservation circuit includes, for example, a motion-detecting switch to detect when the pen is being used to thus activate the LED. The pen preferably includes a pressure-sensitive tip switch and a barrel switch placed near a user's index finger, allowing activation of the barrel switch while the pen is grasped. The tip and barrel switches provide input signals similar to those provided by mouse click switches, permitting various computer input commands, including click and drag functions, menu select commands, etc. For a presentation style pen, the LED is replaced with a semiconductor laser.

The receiver may be oriented in a presentation position and a desk top position. In the presentation position, the optical receiver is oriented approximately perpendicular to the surface; in the desk top position, the optical receiver is angled towards the surface. The optical receiver includes one or more lenses, optical filters, and/or apertured plates placed over the PSD(s) to focus and filter the received light and improve the receiver's signal-to-noise ratio.

The receiver includes circuitry for calculating and outputting a signal representing the position of the pen on the surface. The circuitry includes a filtering circuit which receives and amplifies the signals from the PSD, a digitizing circuit for digitizing the signals, and a microprocessor for calculating the position. The receiver also includes a recharging circuit for recharging the power supply in the pen.

The present invention solves the problems of prior systems in a computer input device which provides cursor positioning, option selecting and other functions typical of mice and trackballs, and also provides inking, gesturing, and the other inputs typical of pen and tablet devices. The wireless computer input system of the present invention has increased accuracy over prior systems and may be manufactured at a lower cost. Additionally, the wireless computer input system of the present invention uses a pen having low power consumption. Furthermore, the present wireless computer input system offers greater flexibility between wireless cursor movement at both short and long distances from the receiver unit.

Other features and advantages of the present invention will become apparent from studying the following detailed description of the presently preferred exemplary embodiment, together with the following drawings.

BRIEF DESCRIPTION OF THE DRAWINGS

FIG. 22 is a schematic top view of an optical receiver similar to that of FIG. 10.

FIG. 23 is a schematic top view of a second alternative embodiment of the optical receiver, with an x-y coordinate system shown thereon.

DETAILED DESCRIPTION OF THE PRESENTLY PREFERRED EXEMPLARY EMBODIMENT

Figure 1:
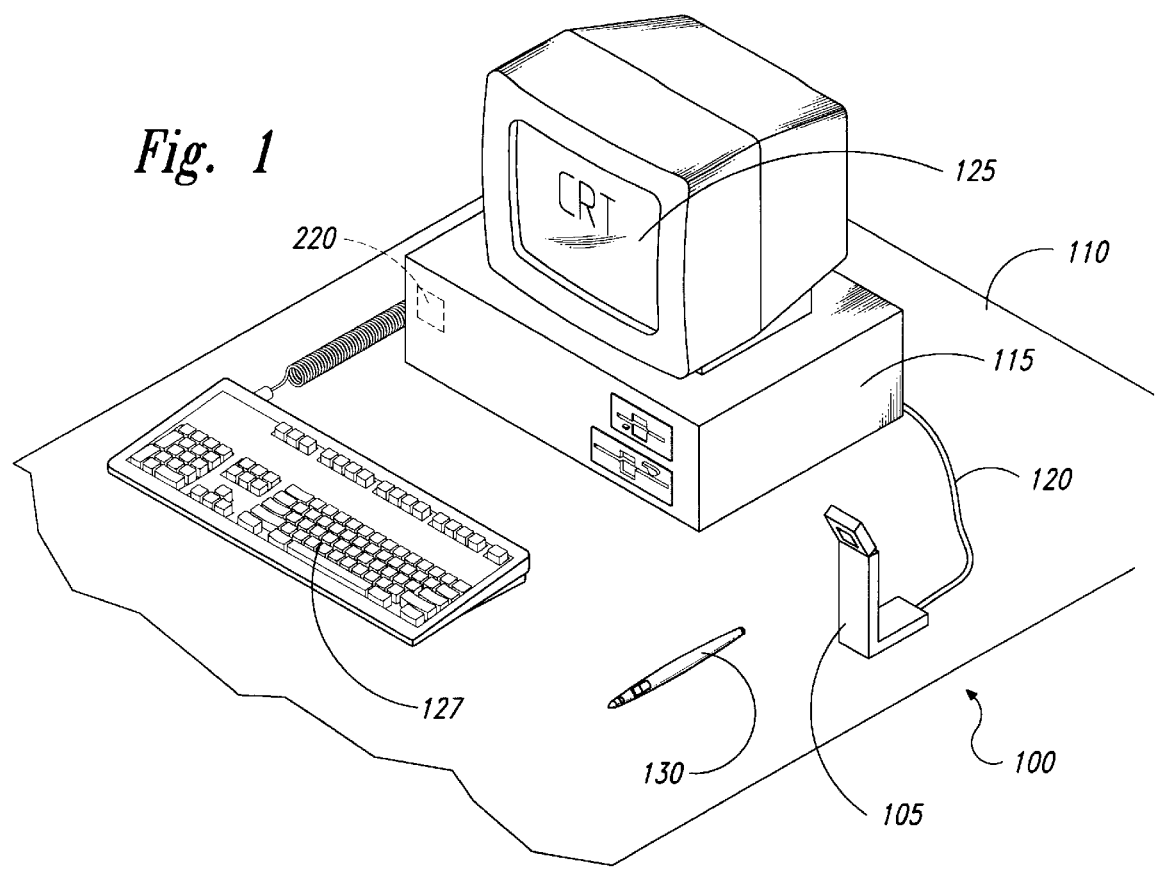
FIG. 1 is an isometric view of the present invention connected to a host computer.

FIG. 1 shows a wireless computer input system 100 according to the present invention. A receiver 105, shown in a desktop mode and placed on a work surface 110, connects to a computer 115 using a cable 120. The computer includes a visual display device 125, such as a CRT, and a keyboard 127. An input device 130 has a light-emitting element that emits light pulses. The input device 130 is preferably pen-shaped and the terms input device and pen are generally used interchangeably herein.

As the pen 130 is moved, the receiver 105 receives the light pulses emitted from the pen. The receiver 105 computes the position coordinates of the pen 130 and outputs them, via cable 120, to the computer 115. The computer 115, in turn, interprets the position coordinates as cursor movements or other user input and displays such movements of the pen 130 as cursor movements on the visual display device 125. Thus, the pen 130 inputs commands to the computer, such as controlling cursor movement, selecting options, moving objects, etc. Although the wireless computer input system 100 of the present invention is described as connected to a computer, the term "computer" as used herein means any device requiring input from a user, including video games, educational systems, presentation systems, etc.

Figure 2:
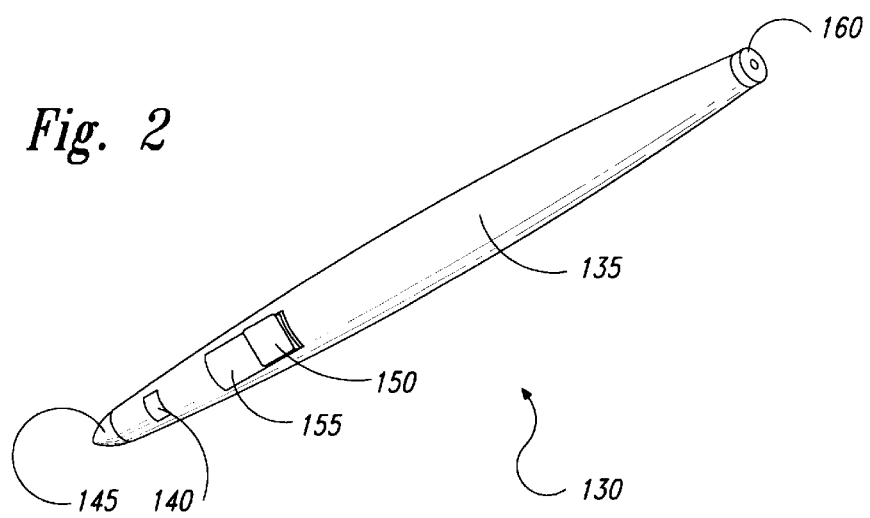
FIG. 2 is an isometric top view of a wireless pen for use in the present invention.

FIG. 2 shows the pen 130 having an approximately tubular housing 135. While the input device 130 is preferably pen-shaped, those skilled in the relevant art will recognize that various other shapes are interchangeable and may be employed. A light-emitting element 140, located proximate to the pen's tip, is preferably an LED. The LED 140 emits light in a fan-like dispersion of up to 180°. The LED 140 preferably has a shape similar to a wedge-shaped section taken from a squat cylinder or conical frustum. Those skilled in the relevant art will recognize, however, that the LED 140 may be selected or designed to emit light in a 360° dispersion, by using, for example, two or more such wedge-shaped LEDs. The LED 140 emits infrared light and preferably light at 940 nanometers.

A tip switch 145, located at a tip of the pen 130, is normally open. When the tip switch 145 contacts a surface with sufficient force, the switch closes, causing generation of a signal as described below.

A finger or barrel switch 150 is located in a planar or recessed region 155 on the exterior of the housing 135. The recessed region 155 is molded to receive the tip of a user's index finger when the pen 130 is properly held. The barrel switch 150 is located behind and proximate to the point of contact of the user's fingertip on the recessed region 155. This location for the barrel switch 150 allows a user to rock back his index finger and activate the barrel switch 150, while maintaining a steady and firm grip on the pen 130.

The tip switch 145 and the barrel switch 150, upon actuation, input signals to the computer, e.g., signals used for click and drag functions, selection of menu options, or other computer input commands similar to those produced by click switches on mice. The pen 130 also includes electrical contacts 160 located at the other tip of the pen 130 to permit the pen's power supply to be recharged, as discussed below.

Figure 3:
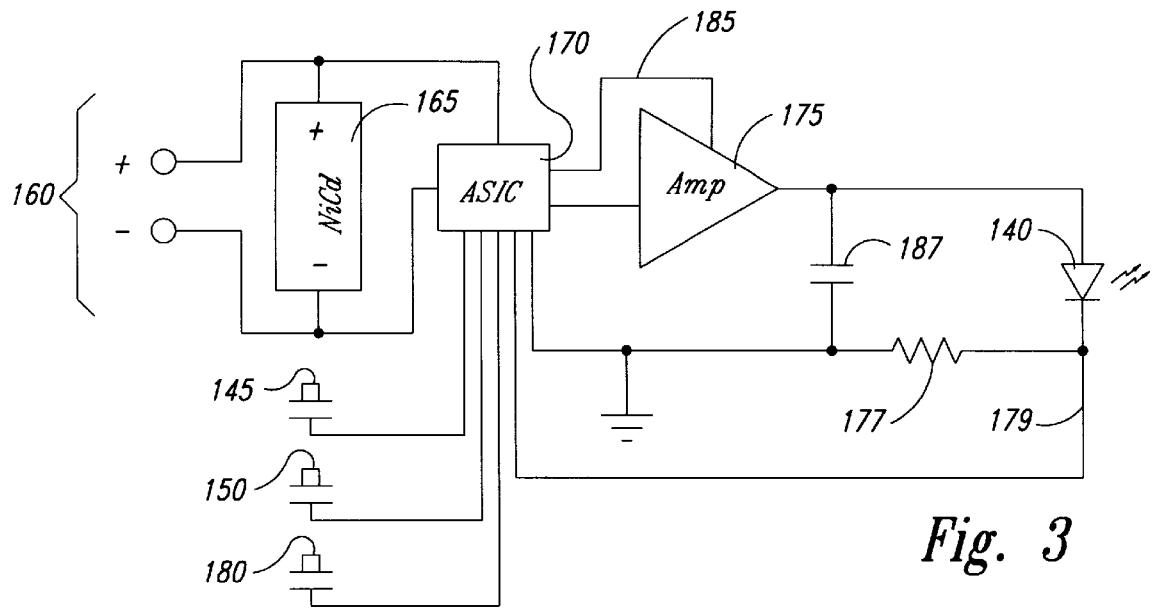
FIG. 3 is a block diagram of the circuitry in the wireless pen of FIG. 2.

FIG. 3 shows a block diagram of the pen's basic circuitry. A rechargeable power supply 165, preferably a rechargeable battery, is connected to the electrical contacts 160 and supplies power to the pen 130. An application specific integrated circuit (ASIC) 170 senses whether the tip switch 145, the barrel switch 150 or a motion-detecting switch 180 are actuated.

Upon actuation of the switch 145, 150, or 180, the ASIC 170 outputs a signal comprising a series of pulses to an amplifier 175. The amplifier 175, preferably a power transistor, amplifies the signal and drives the LED 140, causing the LED to emit pulses of light corresponding to the signal pulses from ASIC 170. A current limiting resistor 177 is coupled between the LED 140 and ground. A feedback circuit 179 coupled between the LED 140 and the ASIC 170, monitors the current through the LED so as to maintain a constant current through the LED even if the power from the power supply 165 decreases below a preferred value.

The ASIC 170 also includes circuitry for performing power management functions. To conserve power, the pen 130 includes the motion-detecting switch 180, preferably a mercury switch, coupled to the ASIC 170. The mercury switch 180 closes and opens when the pen 130 is moved. The ASIC 170 senses these transitions, thus sensing such movement, and resets a timer continuously running in the ASIC 170. The ASIC 170 also resets the timer upon activation of the tip switch 145 or the barrel switch 150. If the timer has counted down to zero, the ASIC 170 sends a signal over a conductor 185 to the amplifier 175, causing the amplifier 175 to turn off or enter into a power conservation mode.

The mercury switch 180 is of a well-known type which is less sensitive to motion when oriented horizontally or vertically, and more sensitive when angularly oriented between these positions. Pens are generally held by most users at an angle between 10° and 90° from the work surface. The mercury switch 180 is therefore positioned within the pen such that it is angularly positioned, and thus more sensitive, when the pen is angularly held. The mercury switch 180 is preferably sensitive enough to detect subtle movement of the pen while held by a user, even though the user is unaware of such slight movements. By detecting such subtle movements, the mercury switch 180 indicates that the pen 130 is active and continuously resets the timer.

In the preferred embodiment, the LED 140 emits light while the timer is running, and thus, while the mercury switch 180 opens and closes. The barrel switch 150 preferably provides input signals similar to those signals provided by a button switch on currently available mice and trackballs. The tip switch 145 preferably provides input signals for entering an enhanced resolution mode as described more fully below.

A capacitor 187, coupled in parallel with the LED 140, helps to conserve power in the pen 130 by storing a charge. The ASIC 170 or the power supply 165 provides a trickle charge to the capacitor 187, constantly keeping a charge stored therein. The capacitor 187 is a charge reservoir for the LED 140, increasing the power conservation of the pen 130. In an alternative embodiment, the ASIC 170 monitors the charge on the capacitor 187 and enters into a power conservation mode if sufficient charge exists in the capacitor to power the pen 130 during idle periods.

Although an infrared LED is preferred for light-emitting element 140, those skilled in the relevant art will recognize that other light-emitting elements operating at other wavelengths are interchangeable and may be used, for example, semiconductor lasers, incandescent light bulbs, and so forth. Additionally, those skilled in the relevant art will recognize that the amplifier 175, the resistor 177 and the capacitor 187 may be integrated with the ASIC 170. An on-off switch (not shown) may be incorporated into the pen 130 to disconnect the power supply 165 from the pen's circuitry.

Figure 4:
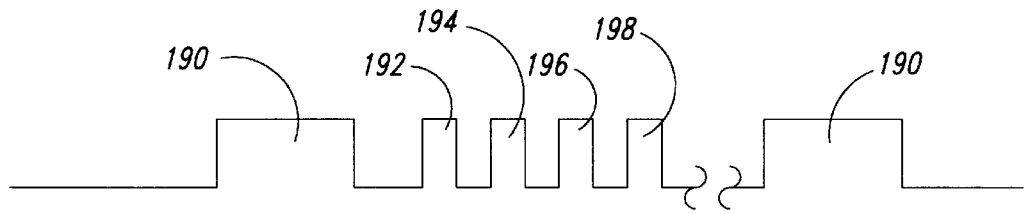
FIG. 4 shows a signal produced by the LED in the wireless pen of FIG. 2.

FIG. 4 shows an example of the signal pulses produced by the ASIC 170 during use of the pen 130. These pulses cause the LED 140 to emit a series of light pulses. Activation of the mercury switch 180 by moving the pen 130 causes the ASIC 120 to produce an initial long pulse 190 which provides the primary signal for activating the LED 140. The pulse 190 is preferably 0.960 millisecond in duration. The time between leading edges of sequential pulses 190 is preferably 10.42 milliseconds. Additional data may be encoded between the pulses 190. For example, a first pulse 192 indicates activation of the tip switch 145, a second pulse 194 indicates activation of the barrel switch 150, a third pulse 196 indicates entry of the pen into a power conservation mode, and an optional pulse 198 may be provided to transmit additional data. For example, the pen 130 may include a tilt sensor producing an attitude of the pen 130. The optional pulse 198, and possibly additional pulses not shown, are generated in response to the attitude of the pen 130. Pulses 192, 194, 196 and 198 are preferably 0.24 millisecond in duration. As is known by those skilled in the relevant art, the pulses are envelopes containing a series of pulses transmitted by being modulated on a carrier, preferably a carrier at 8.192 kilohertz or factors thereof.

The ASIC 170 transmits the pulses 190, via LED 140, at multiple rates. Generally, the ASIC 170 causes the LED 140 to transmit at a relatively low rate, e.g., 48 pulses per second. This lower rate helps conserve power and is adequate for most cursor movement and other lower resolution functions. For example, if a user is moving the pen 130 over the work surface 110, gross cursor control is acceptable for inputting commands, simple cursor movement or object positioning. In some applications, the user may desire high resolution input obtainable by activating the appropriate command, such as actuating the tip switch 145 by depressing it against the work surface 110. When the tip switch 145 is thus actuated, the pulses 190 are transmitted at a high rate, e.g., 96 per second. At this rate, the receiver 105 is in an enhanced resolution mode and is able to recognize fine pen movements. Enhanced resolution is ideal for handwriting recognition, computer aided design (CAD), graphic/artistic data input, and other applications requiring similarly detailed input. After a suitable delay, e.g., approximately 6 seconds after actuation of the tip switch 145, the ASIC 170 switches from the enhanced resolution mode back to the power conserving low resolution mode (i.e., 48 envelopes per second).

In a first alternative embodiment of the pen 130, a pressure sensitive switch replaces the standard tip switch 145. The pressure sensitive tip switch allows several different signals to be input to the computer depending upon the amount of pressure used in actuating this switch. Preferably, the pressure sensitive switch is a 16-position switch allowing for 16 discrete output signals. Such a switch allows, e.g., 16 breadths of lines to be input to the computer in artistic or graphic applications allowing for a brush-type input. The tip switches may be replaced as they wear.

In a second alternative embodiment of the pen 130, the LED 140 is eliminated and the tip switch 145 is replaced by a semiconductor laser, transforming the pen 130 to a presentation wand. Upon activation of the barrel switch 150, the semiconductor laser is illuminated allowing cursor movement when the receiver 105 is in a presentation mode. The semiconductor laser would provide enough energy to allow the user to stand at a substantial distance from the receiver (at least 1 meter), and by moving the wand, the receiver 105 is able to detect these movements and translate them into cursor movement coordinates.

In a third alternative embodiment for the pen 130, the pen also contains a ball-point tip or other writing means with an ink cartridge. The writing means allows the pen 130 to write as a standard ink pen.

Figure 5:
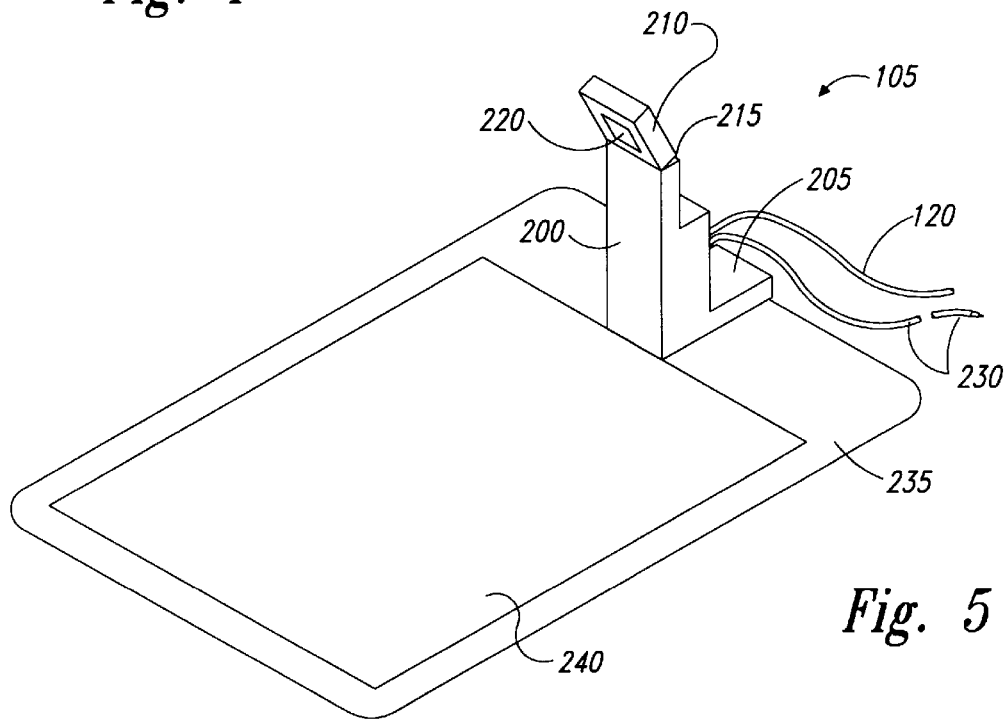
FIG. 5 is an isometric view of the receiver of the present invention shown oriented in a desktop mode.
Figure 6:
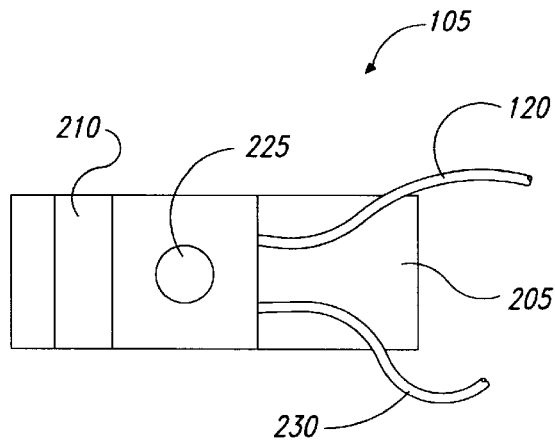
FIG. 6 is a top view of the receiver of FIG. 5.
Figure 7:
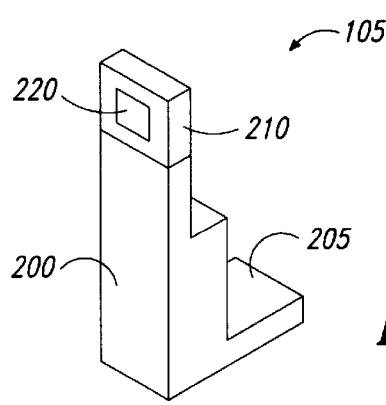
FIG. 7 is an isometric view of the receiver of FIG. 5 shown oriented in a presentation mode.

FIGS. 5, 6 and 7 show the receiver 105 as having a roughly rectangular housing 200 extending upwardly from a base 205. An upper portion 210 is connected to an end of the housing 200 by a hinge 215. An optical receiver 220 is located in the upper portion 210 at a selected height H from the work surface 110. The optical receiver 220 has an approximately square field of view, i.e., a square-shaped active area. For a given height H of the optical receiver 220, the active area is preferably a square-shaped area having sides 2H in length, providing simpler calculations for computing coordinates of the pen. The hinge 215 permits the upper portion 210, and thus the optical receiver 220, to be positioned at an angular orientation over the work surface 110 in the desktop mode (FIG. 5) or approximately perpendicular to the work surface in the presentation mode (FIG. 7). In the desktop mode, the optical receiver 220 is preferably at a selected angle θ relative to the work surface of 45°. The height H and the angle θ, and the various optical elements discussed below, may be varied to provide various sized active areas for the optical receiver 220.

In the desktop mode, the pen 130 is moved about the work surface 110 while the receiver 105 concurrently receives, computes and outputs the coordinates of the pen. In the presentation mode, the "work surface" is a plane in space approximately parallel to the optical receiver 220. No actual work surface is used, rather, the pen 130 is moved in space before the receiver 105.

A tubular bore 225 in the receiver 105 is sized to receive the end of the pen 130 containing the electrical contacts 160. The bore 225 allows the pen 130 to be recharged when inserted therein, when the pen is not in use. A power cable 230 extending from the receiver 105 is designed to couple with the electrical contacts 160 of the pen when not in use to provide power to the pen when the battery 165 lacks sufficient power. The power cord 230 is preferably stored within a rear compartment within the receiver 105 (not shown).

A portable work surface 235, preferably rectangular in shape, is designed to fixedly and removably receive the receiver 105 at the middle of one edge, positioning the optical receiver 220 to receive light from an approximately square shaped area 240. The portable work surface 235, with the receiver 135 fixedly attached, permits a user to hold the work surface 235 as a clipboard, liberating the user from using the computer input system 100 only on a stationary work surface. The area 240 is preferably a demarcated area on the portable work surface 235, having a color, texture, etc., different from the surrounding surface. The demarcated area 240 indicates the active area for using the pen 130. After using the portable work surface 235, the area 240 helps users visualize the active area for using the pen 130 on any work surface, training them to operate the pen 130 in such an area.

In an alternative embodiment for the portable work surface 235, the area 240 is a flat panel display such as the visual displays common in currently available laptop computers. The portable work surface 235 is itself coupled to the computer 115, allowing a display on the area 240 similar to that shown on the visual display device 125. As the pen 130 is moved on the area 240, the cursor would move with the pen on the display, and thus would remain underneath the tip of the pen.

Figure 8:
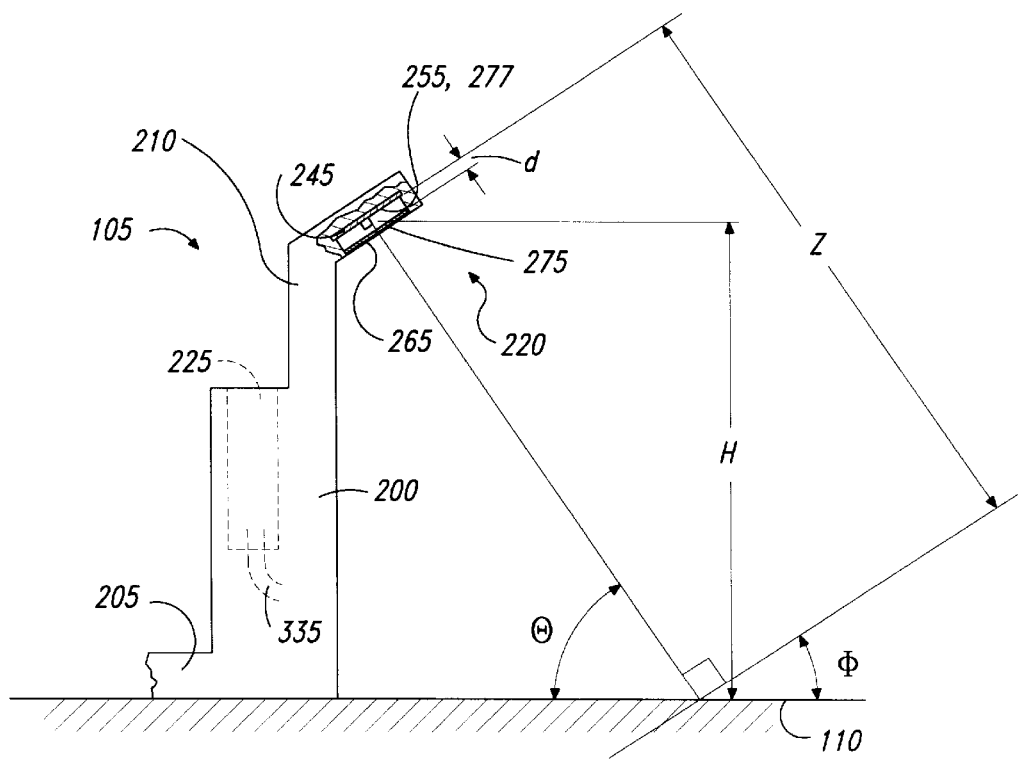
FIG. 8 is a side view of the receiver of the FIG. 5, having a cutaway showing an optical receiver in the receiver.
Figure 9:
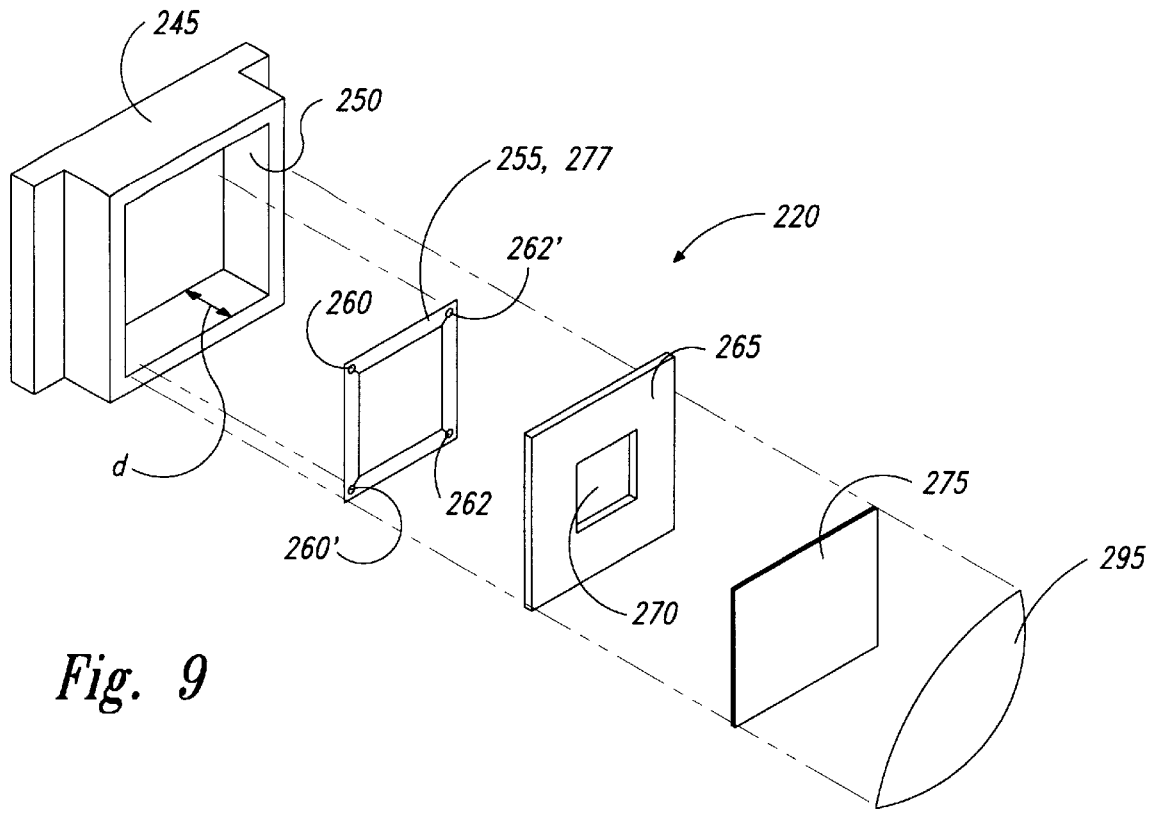
FIG. 9 is an exploded isometric view of the optical receiver of the present invention.

FIGS. 8 and 9 show the optical receiver 220. The optical receiver 220 includes a frame 245 having an opening 250. A light-detecting element 255 is fixed to an inner wall of the frame 245, opposite the opening 250. The light-detecting element 255 is preferably a PSD and the terms light-detecting element and PSD are generally used interchangeably herein. A PSD is a unitary device which outputs signals indicating the exact position of an impinging light spot, independent of the amount of impinging light. Those skilled in the relevant art may select from any such PSDs currently available, such as those manufactured by Hamamatsu Corporation. PSDs are the preferred type of light-detecting elements used in the present invention for various reasons, including their ability to provide accurate position signals of an impinging light spot and because they are not necessarily dependent upon the amount of received light.

A problem encountered by the present invention is ambient electromagnetic interference or noise (EMI). EMI, produced by electronic devices operated in the same environment as the present invention, degrades the signal-to-noise ratio (S/N) of the receiver 105. The frame 245 is preferably made of tin plate steel connected to a common ground to help mitigate EMI and improve the S/N. The frame 245 may also be made of a resin material having inherent EMI shielding properties. Alternatively or additionally, the frame 245 is coated with an electromagnetic guard coating such as PANLITE™, manufactured by Teijin Kasei.

The PSD 255 shown in FIG. 9 is of a two dimensional type, and therefore has two pairs of terminals: 260 and 260', and 262 and 262'. Hamamatsu Corporation currently manufactures three types of two-dimensional PSDs: a duo-lateral type, a tetra-lateral type, and a pin-cushion type. Any of these three types of two-dimensional PSDs may be used in the present invention. A particular type of two-dimensional PSD may be selected based upon other design criteria, as is known by those skilled in the relevant art. The PSD 255 is preferably square, 12–25 mm per side. An apertured plate 265 covers the opening 250 and is secured to the frame 245 so as to be positioned approximately parallel with the PSD 255. An aperture 270 in the plate 265 is preferably square-shaped and is smaller than the size of the PSD 255. For example, if a PSD 255 having an active area of 20 mm per side is used, the aperture 270 is preferably square, 5–15 mm per side. The aperture 270 restricts the field of view, and therefore the light spot impinging upon, the PSD 255. Although the aperture 270 directs an approximately square shaped light spot on the PSD 255, as used herein, the terms "light spot" and "spot of light" refer to any shape of light impinging on the light-detecting elements described herein.

Regardless of the shape, the area of the light spot must be smaller than that of the light detecting element. For a PSD, the light spot is preferably quite small to improve the S/N of the receiver 105, but is greater than pin hole sized.

An optical filter 275 is fixedly attached over the plate 265 and the aperture 270. The filter 275 is selected from known filters so as to block EMI and improve the S/N of the receiver 105. In the present invention, the PSD 255 is preferably tuned to receive light at a peak wavelength of approximately 940 nm, and the filter 275 is preferably of a band-pass type to permit light at approximately 940 nm to pass therethrough. Those skilled in the relevant art will recognize, however, that the PSD 255 and the filter 275 may be tuned to receive and pass electromagnetic radiation at other wavelengths when another LED 140 is used in the pen 130.

An optional lens 295, secured over the apertured plate 265, draws in more light from the LED 140 than without a lens, and focuses the light, together further improving the S/N of the receiver 105. In the presentation mode, an approximately spherical lens 295 produces a circular light spot on the light-detecting element 255. With the same lens, when the optical receiver 220 is angled towards the work surface in the desktop mode, the light spot has a more oblique shape. If the receiver 105 is to be used primarily in the desktop mode, a non-spherical lens or other more sophisticated optics may be used to correct for this optical aberration, as is known by those skilled in the relevant art. Otherwise, the oblique light spot shape is not a sufficient optical aberration to cause pen position calculation error.

The optical filter 275 could be integrated with the lens 295 as a film deposited on a surface of the lens. Alternatively, the lens 295 could be doped with an appropriate filtering material such that the composition of the lens itself provides the filtering functions described above. The lenses, apertured plates, and/or optical filters are each referred to herein as optical elements, and the lenses and apertured plates are each adapted to direct a light spot on a light-detecting element.

In a first alternative embodiment of the optical receiver 220, a four division photodiode (quad photodiode) 277 replaces the two-dimensional PSD. This first alternative embodiment, and all alternative embodiments described herein, are substantially similar to the appropriate first described embodiment and common elements or components are identified by the same numbers. Only the differences in construction and operation are described in detail. For example, the most significant difference between the first alternative embodiment of the optical receiver 220 and the embodiment described above is the use of the quad photodiode 277; the remaining elements of the receiver 105 are substantially similar in this first alternative embodiment as in the embodiment described above.

In the first alternative embodiment, when the pen 130 is moved on the work surface 110, the light spot impinging on the quad photodiode moves in a corresponding manner. The amount of light received by each quadrant of the quad photodiode 277 varies as the light spot moves. Based on the different amounts of light received by each quadrant, the receiver 105 may calculate the position of the pen, as described below.

Figure 10:
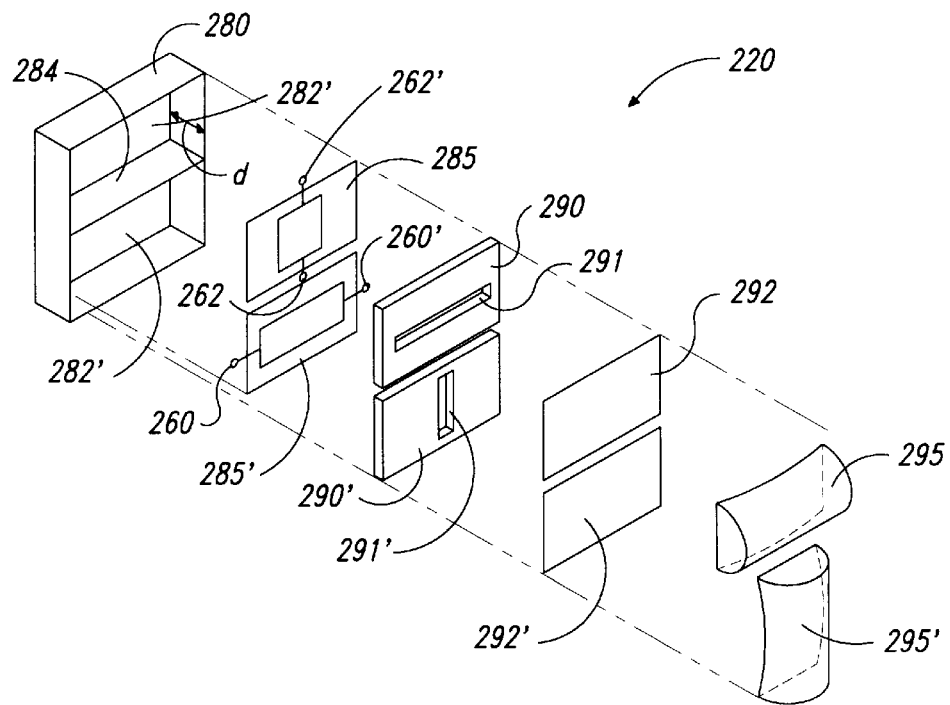
FIG. 10 is an exploded isometric view of the optical receiver of a second alternative embodiment of the receiver of the present invention.

FIG. 10 shows a second alternative embodiment of the optical receiver 220 using a frame 280 and two one-dimensional PSDs, 285 and 285'. The length of each one-dimensional PSD is preferably between 12–25 mm, and preferably has a width of at least 0.7 mm. Openings 282 and 282' in the frame 280, formed by an optical baffle 284, are sized to receive the PSDs 285 and 285', respectively. The PSD 285 is aligned in a first direction (e.g., vertically) with respect to the work surface, having a pair of electrodes 262 and 262'. The PSD 285' is aligned in a second direction perpendicular to the first direction (e.g., horizontally), having electrodes 260 and 260'. Apertured plates 290 and 290' fixedly attach over the openings 282 and 282', respectively. The plate 290 has a horizontally aligned slotted aperture 291; the plate 290' has a vertically aligned slotted aperture 291'.

Optional lenses 295 and 295' fixedly attach to plates 290 and 291', respectively, and fixedly sandwiched therebetween are optical filters 292 and 292', respectively. The lenses 295 and 295' have a suitable shape, preferably a shape to produce a linear focus, e.g., a semicylindrical shape. The focus of the lens 295 is horizontally shaped so as to direct light through the slotted aperture 291; conversely, the focus of the lens 295' is vertically shaped so as direct light through the slotted aperture 291'.

Figure 11:
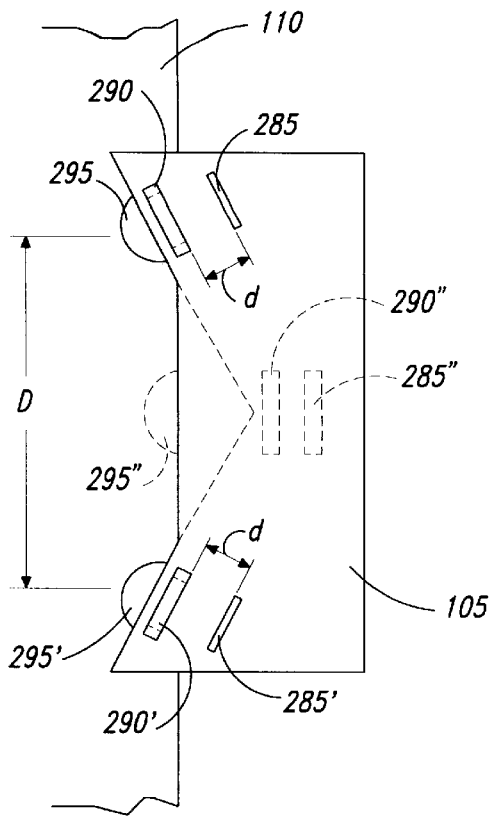
FIG. 11 is a schematic top view of a third alternative embodiment of the receiver of the present invention.

FIG. 11 shows a third alternative embodiment of the optical receiver 220 where two one-dimensional PSDs are separated from each other by a selected distance D. Since the two one-dimensional PSDs are separated from each other by a distance D, the shape of the housing for the receiver 105 differs from that used with the other embodiments described herein, and in this way, the optical receiver 220 differs from the other optical receiver embodiments described herein. The two PSDs may be located in the same plane (i.e., not angled towards each other), as shown in FIG. 23. This arrangement allows for simpler calculations, however, the PSDs are preferably angled towards each other to decrease the active area on the work surface. This third alternative embodiment is substantially limited for use in the desktop mode.

The third alternative embodiment includes a pair of one-dimensional PSDs 285 and 285', both horizontally oriented with respect to the work surface 110. Apertured plates 290 and 290', and lenses 295 and 295' are positioned before the PSDs 285 and 285', respectively.

In the embodiments described herein, as the LED 140 moves on the work surface, the light spot received by any of the light-detecting elements moves in an opposite direction from the pen's movement. For example, referring to the second alternative embodiment, the lens 295 receives the light emitted from the LED and focuses it as a horizontally oriented light spot projected through the slot 291 and onto the PSD 285. As the LED moves in a diagonal direction, from left to right on the work surface and from further to closer to the receiver 105, the light spot impinging on the PSD 285 moves vertically upward. Concurrently, the lens 295' receives and focuses a vertically oriented light spot through the slot 291' and onto the PSD 285'. This light spot impinging on the PSD 285' moves horizontally right to left. The PSD 285 outputs two changing current signals from its electrodes 262 and 262' indicating movement of the pen along a vertical axis, and the PSD 285' outputs a pair of changing current signals from its electrodes 260 and 260' indicating movement of the pen along a horizontal axis.

Figure 12:
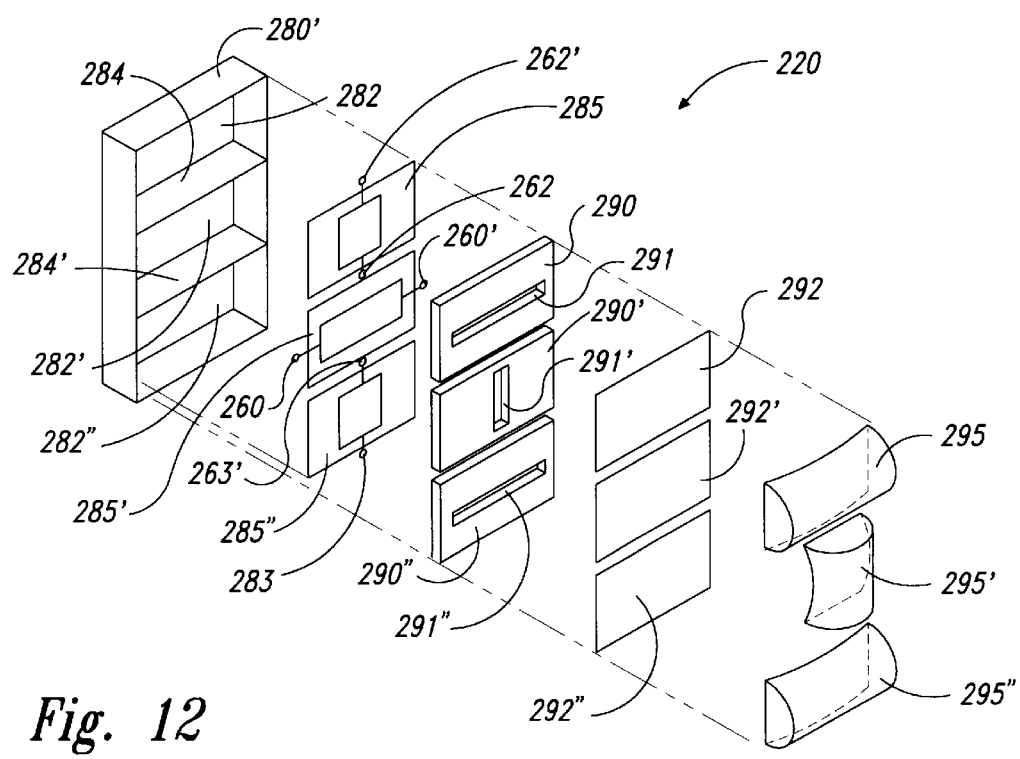
FIG. 12 is an exploded isometric view of the optical receiver of a fourth alternative embodiment of the receiver of the present invention.

FIG. 12 shows a fourth alternative embodiment of the optical receiver 220 capable of calculating three dimensional coordinates of the pen 130. In this fourth alternative embodiment, a frame 280' has three openings 282, 282' and 282", formed by a pair of optical baffles 284 and 284'. Three one-dimensional PSDs 285, 285' and 285", oriented vertically, horizontally, and vertically, respectively, are received by the openings 282, 282' and 282", respectively. An apertured plate 290, having a horizontally oriented slot 291, is fixedly attached over opening 282; an apertured plate 290', having a vertically oriented slot 291', is fixedly attached over opening 282; and, an apertured plate 290", having a horizontally oriented slot 291", is fixedly attached over opening 282". Lenses 295, 295' and 295", preferably doped with an appropriate filtering material, are fixedly attached over slotted plates 290, 290' and 290", respectively. The lenses 295, 295' and 295" have linear foci oriented horizontally, vertically, and horizontally respectively. The PSDs 285 and 285' provide signals indicating movement of the pen along vertical and horizontal axes, respectively. The signals output by the PSDs 285 and 285" are used to triangulate the third coordinate position of the pen.

The optical receiver 220 shown in FIG. 11 may be modified to provide three-dimensional coordinates of the pen 130. As shown in dashed lines in FIG. 11, the third PSD 285", the slotted plate 290", and the lens 295" are positioned between the PSDs 285 and 285', and associated light-constricting optics. The PSD 285" and the slotted aperture 290" are oriented vertically and horizontally, respectively, with respect to the work surface 110. The PSD 285" provides the signals used to compute the third or Z coordinate for the pen 130.

Figure 13:
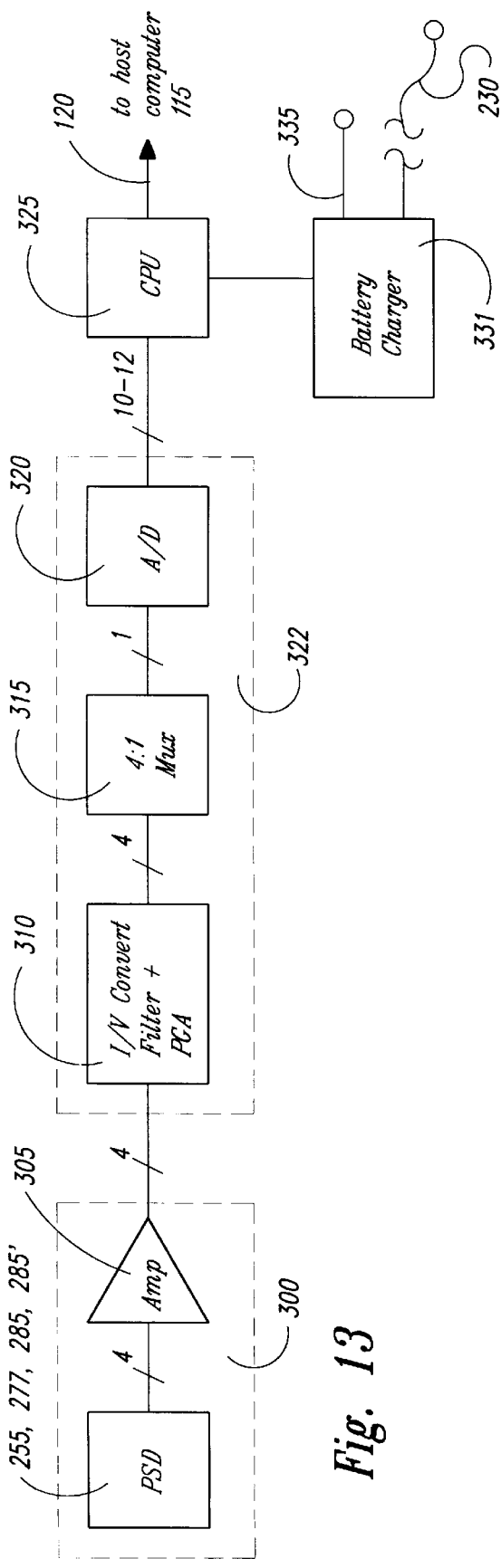
FIG. 13 is a block diagram of the circuitry in the receivers of FIGS. 5–12.

FIG. 13 shows the basic circuitry used by the receiver 105. The two-dimensional PSD 255, the quad photodiode 277, or the two one-dimensional PSDs 285 and 285', are preferably integrated on a chip 300 with one or more amplifiers 305 for amplifying the current signals output from the electrodes 260, 260', 262 and 262'. On-chip amplification helps improve the S/N of the receiver 105. Alternatively, the amplifier 305 could be a component or components separate from the light-detecting elements such as a monolithic, hybrid or discrete chip.

A circuit 310 filters the amplified signals from the amplifier 305 and converts them from current-based signals to voltage-based signals. Preferably, a low pass or band pass filter is used to eliminate EMI and further improve the S/N of the receiver 105. A programmable gain amplifier in the circuit 310 improves the S/N of the signals input to the circuit by adjusting the gain. When the LED 140 is closer to the receiver 105, a stronger light signal is received, while a weaker light signal is received when the LED is farther from the receiver, changing the amplitude of the signals output by PSDs. The programmable gain amplifier in the circuit 310 compensates for these changes in amplitude. Alternatively, an automatic gain amplifier may be used instead of a programmable gain amplifier, as is known by those skilled in the relevant art to be interchangeable.

A four-to-one multiplexer 315 receives the four signals output from the circuit 310 and converts them to a single signal. One or more analog to digital (A/D) converters 320 receive the single signal, convert it a digital signal and output it in parallel over a 10–12 line bus to a central processing unit (CPU) 325. The CPU performs digital signal processing to the inputted signal, calculating the position coordinates of the pen. The position coordinates are then output to the host computer 115 as a coordinate signal. The coordinate signal may be of any appropriate form usable by the computer 115, e.g., the mouse signals described in *Microsoft Mouse Programmer's Reference,* Microsoft Press.

Preferably, the circuit 310, the multiplexer 315, and the A/D converter 320 are monolithically integrated on a chip 322. Alternatively, the multiplexer 310 and A/D converter 320 are integrated together, or the A/D converter 320 and the CPU 325 are integrated together. The A/D converter 320 preferably has a 6–8 microsecond conversion rate and uses oversampling for increased resolution of the receiver 105. The CPU 325 is preferably of a microcontroller type, having on-chip memory (both ROM and RAM). The CPU 325 is electrically coupled to, and regulates the functioning of, the circuit 310, particularly the programmable gain amplifier circuit.

A battery charging circuit 331, controlled by the CPU 325, recharges the pen's battery 165 when the pen 130 is inserted into the bore 225. The bore 225 contains recharging contacts 335 which electrically couple with the electrical contacts 160 on the pen 130 when the pen is inserted therein. The battery charging circuit 331 provides a quasi-constant current to the battery 165 through the recharging contacts 335. The battery charging circuit 331 has an automatic timer shutoff controlled by the CPU 325.

The power cord 230 intercouples the battery charging circuit 331 with the pen 130. An interlock connector prevents both the power cable 230 and the battery recharging functions from being activated simultaneously, thus avoiding undue current drain on the battery charging circuit 331. An external power supply (not shown) provides power to the battery charging circuit 331.

Figure 14:
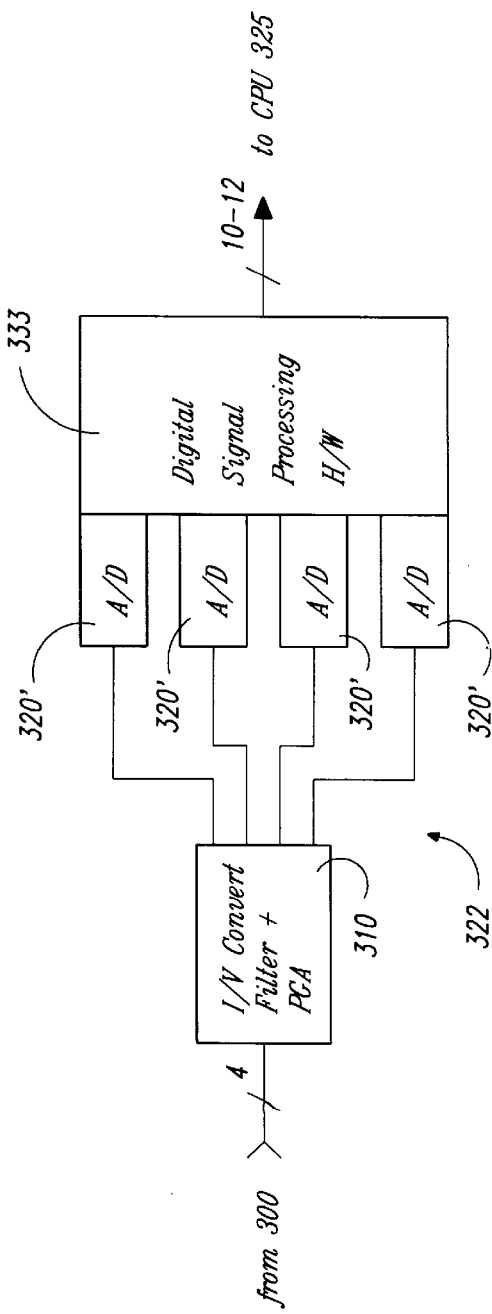
FIG. 14 is a block diagram of an alternative embodiment of the circuitry of FIG. 13.

FIG. 14 shows a first alternative embodiment for the chip 322. The four outputs from the circuit 310 are received by four separate A/D converters 320'. These four A/D converters 320' are monolithically integrated with a digital signal processing (DSP) circuit 333. The DSP circuit 333 computes the coordinates of the pen 130 and outputs a position signal to the CPU 325. The A/D converters 320' are preferably controlled by the CPU 325. The circuit 310 may be monolithically integrated with the A/D converters 320' and the DSP circuit 333. Alternatively, the A/D converters 320', DSP circuit 333 and the CPU 325 may be monolithically integrated, or circuit 310, A/D converters 320', DSP circuit 333 and CPU 325 may all be integrated. The position calculation may also be done by dedicated hardware circuitry within the chip 322 primarily by the DSP circuit 333.

Figure 15:
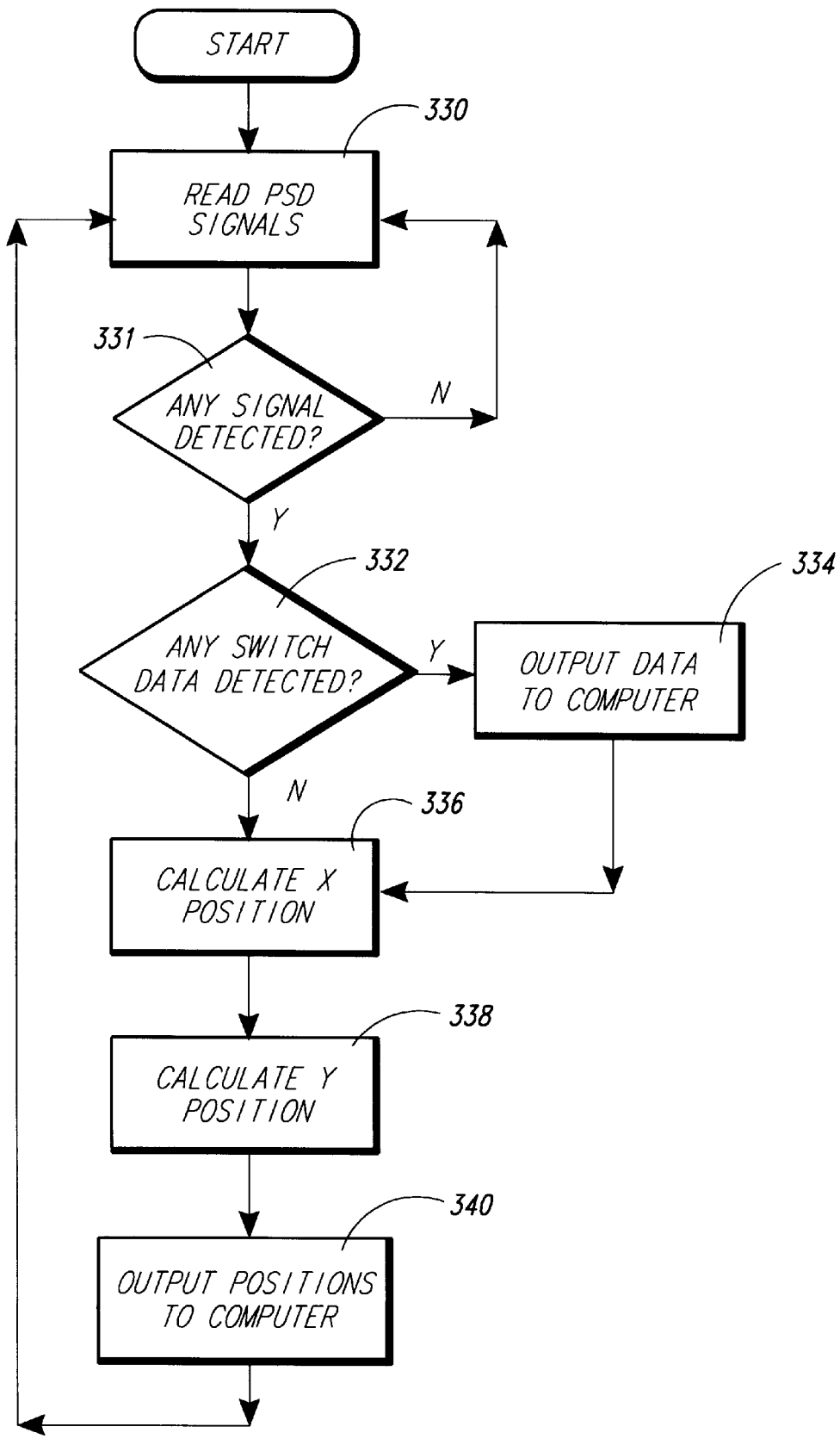
FIG. 15 is a flowchart showing the steps performed by the receivers of FIGS. 5–12.

This first alternative embodiment provides a more hardware-based solution to calculating the pen's coordinates; the embodiment depicted in FIG. 13 computes coordinates using a software-based method executed by the CPU 325. With either embodiment, the pen's coordinates are calculated using the same basic method. An example of the method for calculating the pen's two-dimensional position coordinates is shown in FIG. 15. In step 330, the CPU 325 reads the signals output from the PSD. In step 331, the CPU 325 determines whether any signals are detected from the PSD, and if not, the CPU continues to read the signals output from the PSD. If signals are detected, then, in step 332, the CPU 325 determines whether any switch or pulse data is present in the inputted signal. Switch or pulse data includes the pulse signals 192, 194, 196 and 198 shown in FIG. 4. The CPU 325 preferably has a clock which provides timing for the receiver 105. The CPU 325 detects the pulse data by determining the time between the falling edge of the pulse 190 and the next leading edge. Depending upon the time between the trailing edge and the next leading edge, the CPU 325 determines the existence of, and distinguishes between, the pulses 190 and each of the pulses 192, 194, 196 and 198. If any of the pulse signals 192–198 are present, then the CPU 325, in step 334, outputs these pulse signals to the host computer 115 to be interpreted by software in the computer.

In step 336, the CPU 325 calculates the X coordinate of the pen. Thereafter, in step 338, the CPU 325 calculates the Y coordinate of the pen. In step 340, the CPU 325 outputs the X and Y coordinates to the host computer 115. Steps 330 through 340 are repeated continuously as the pen 130 moves about the work surface 110. As a result, the CPU 325 continuously calculates and outputs the coordinates of the pen 130, "tracking" the motion of the pen while it is in use. The three-dimensional coordinates of the pen 130 may be readily calculated by calculating the Z coordinate of the pen in an additional step prior to step 340. Based on the description provided herein, the circuitry shown in FIGS. 13 and 14 may be readily and appropriately modified by those skilled in the relevant art to compute three-dimensional coordinates.

A switch (not shown) in the hinge 215 provides a signal to the CPU 325 indicating whether the optical receiver 220 is oriented in the presentation mode or the desk top mode. Based on these signals, the CPU 325 makes adjustments in computing the coordinates of the pen 130, i.e., the CPU employs the appropriate equations provided below. In a second alternative embodiment, the position calculation may be performed by the computer 115, where some or all of the circuitry in the receiver 105 is eliminated and the output signals from the optical receiver 220 are input directly to appropriate circuitry in the computer 115.

Figure 16:
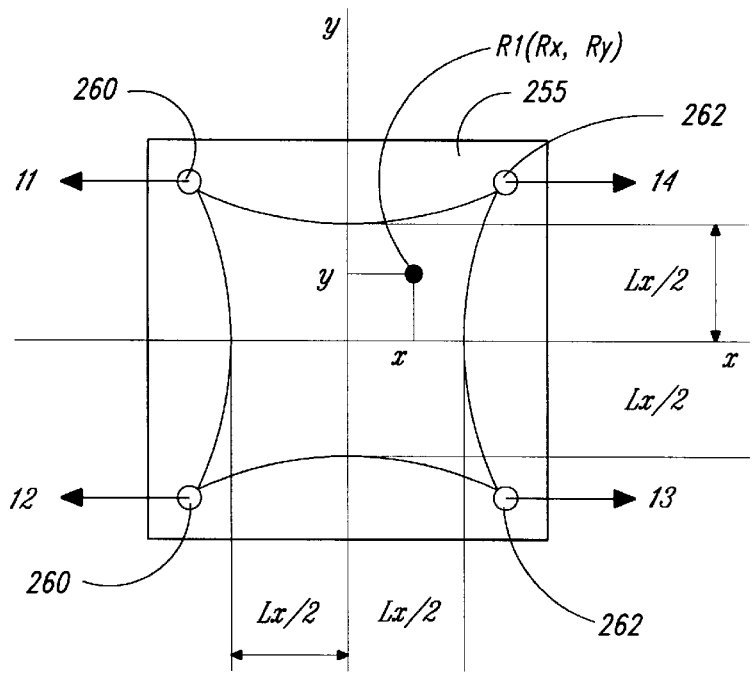
FIG. 16 is an enlarged top view of a two-dimensional PSD, with an x-y coordinate system shown thereon.

The calculation of the X and Y coordinates by the present will now be described. FIG. 16 shows the two-dimensional PSD 255 having a coordinate system superimposed thereon. The terminals 260, 260', 262 and 262' output current signals I1, I2, I3, and I4, respectively. A light spot is shown impinging on the PSD 255 at point R1 having coordinates (Rx, Ry). The X and Y coordinates of this spot are computed by the following equations:

$$R_x = \frac{(I3 + I4) - (I1 + I2)}{I0} \cdot Lx \quad (1)$$

$$R_y = \frac{(I1 + I4) - (I2 + I3)}{I0} \cdot Ly \quad (2)$$

where I0=I1+I2+I3+I4. Using a square PSD with an active area having dimensions L per side, Lx=Ly=L.

Figure 17:
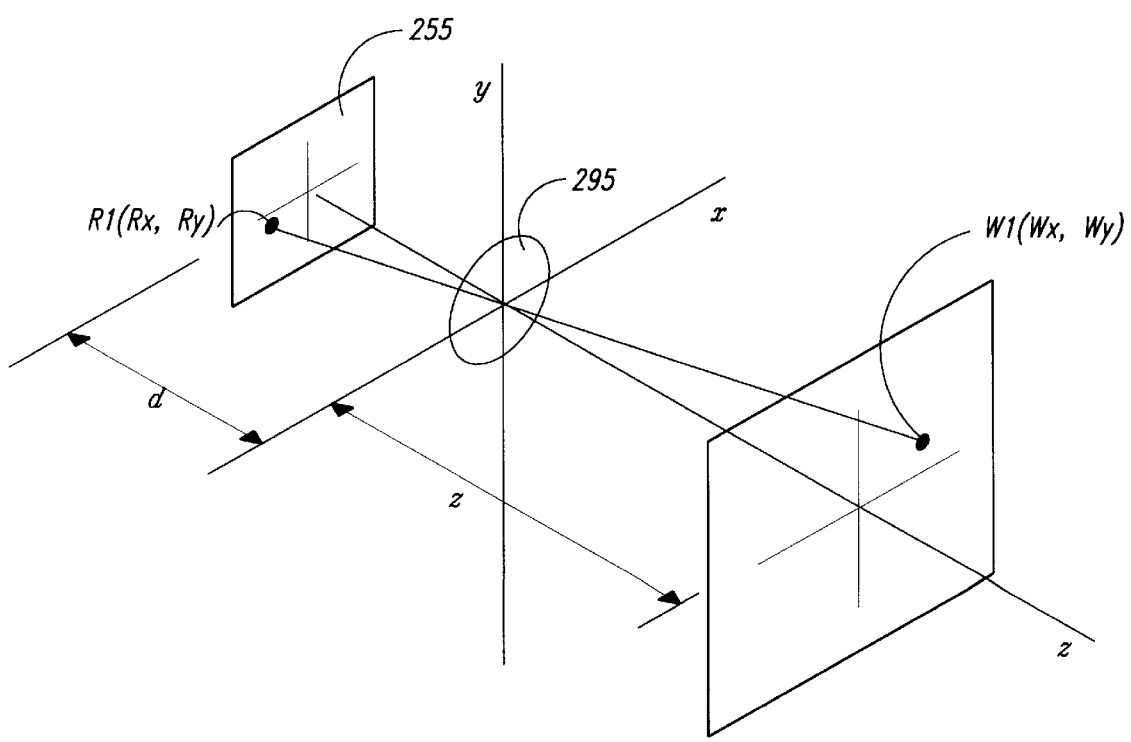
FIG. 17 is a schematic of the optical receiver of FIG. 9 oriented in a presentation mode, with an x-y-z coordinate system shown thereon.
Figure 18:
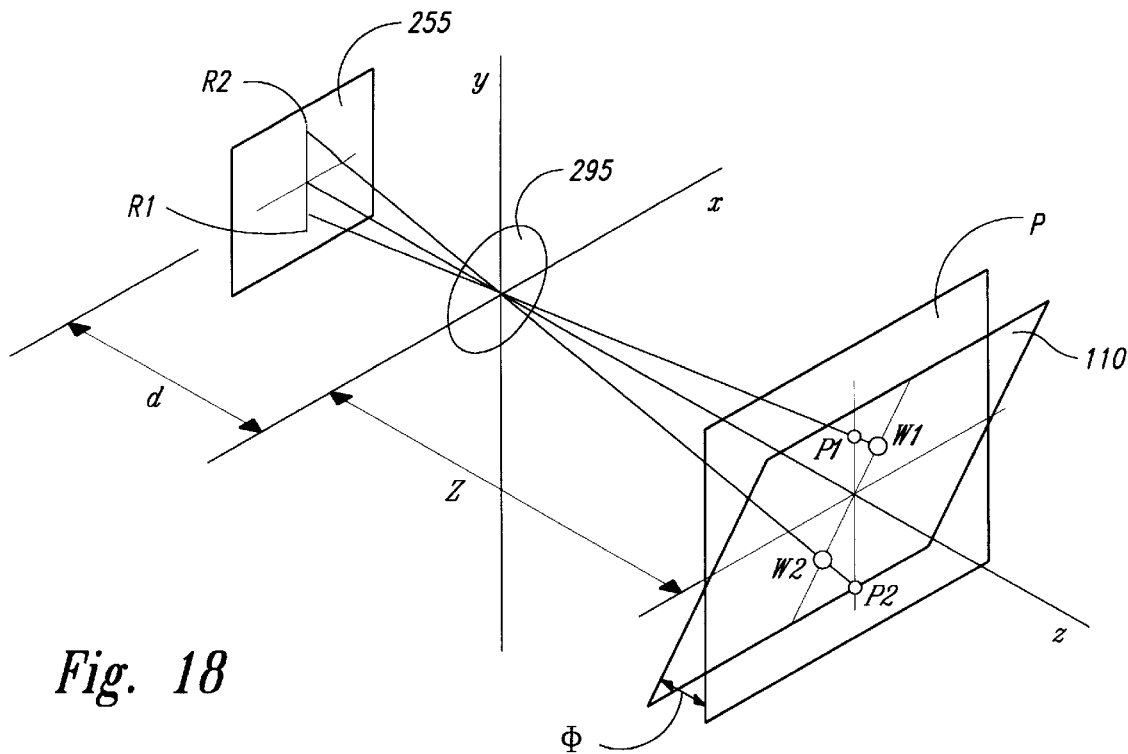
FIG. 18 is a schematic isometric view of the optical receiver of FIG. 9 oriented in a desktop mode, with an x-y-z coordinate system shown thereon.
Figure 19:
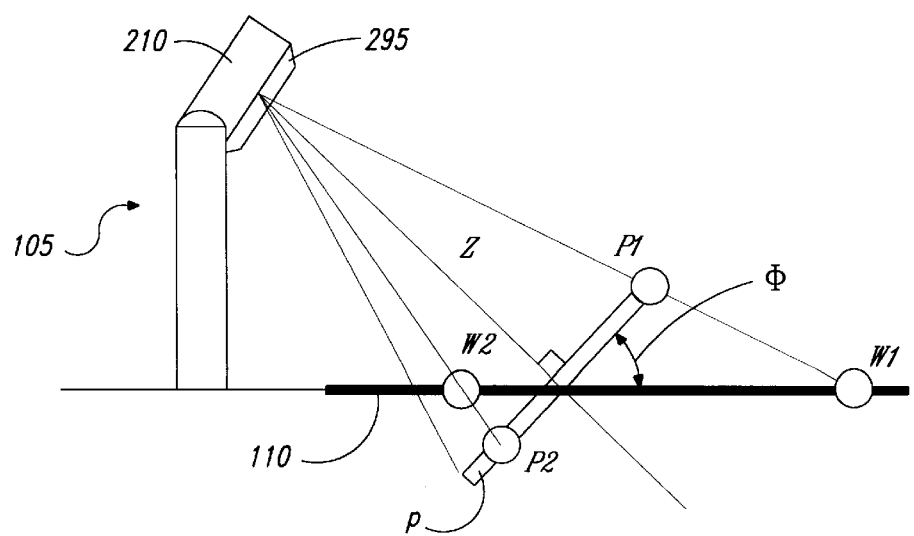
FIG. 19 is a side view of the optical receiver of FIG. 18.

FIG. 17 shows the case of computing coordinates of the LED 140, when the receiver 105 is in the presentation mode, as shown in FIG. 7. In this mode, the work surface is a plane in space approximately parallel to the PSD 255. In FIG. 17, the pen 130 is located at point W1 in space having coordinates (Wx, Wy), and at a distance Z from the lens 295 of the receiver 105. The LED 140 at point W1 projects a spot of light on the PSD 255 at point R1 having coordinates (Rx, Ry). The LED 140 preferably emits a fan-like pattern of light. While the optical receiver 220 receives and focuses a portion of this light, the following discussion and the figures are directed to only a single ray of light emitted from the LED 140 and received by the PSD 255. Those skilled in the relevant art will recognize that such a single ray of light is used for purposes of illustrating the calculation of the X and Y coordinates of the pen 130. The position of the LED 140 is computed based on the following formula:

$$(Wx, Wy) = k(Rx, Ry) \quad (3)$$

where k=−1 (Z/d), and where d is the distance between the lens 295 and the PSD 255.

FIGS. 18 through 21 show the case of computing coordinates of the LED 140 when the receiver 105 is in the desktop mode. The distance between the lens 295 and the center of the work surface 110 is a fixed distance Z. When the optical receiver 220 is tilted toward the work surface, the PSD 255 provides position data based on a virtual projection plane P. The virtual projection plane P and the work surface 110 are separated from each other by a fixed angle θ. A PSD is able to determine the position of a light spot on a plane parallel with the PSD. When the work surface 110 is tilted away from a position parallel with the PSD, the PSD nevertheless outputs signals indicating the position of the pen on the virtual plane parallel to the PSD. For example, when the LED 140 is on the work surface 110 at point W1, the position data output by the PSD 255 indicates that the LED 140 is at a point P1 in the virtual plane P. Similarly, when the LED 140 is at point W2, the PSD 255 outputs position data as if the pen were located at point P2 on the virtual plane P. Therefore, the receiver 105 computes the transformation from point P1 to W1 and from P2 to W2 to determine the proper position of the LED 140. For simplicity, points W1 and W2, and P1 and P2, on the z-y plane will be considered.

The tip of the pen 130 is generally positioned on the work surface, for example, at points W1 and W2. Although the LED 140 is not exactly at the points W1 and W2 on the work surface, the distance between the tip of pen 130 on the work surface and the LED 140 is generally insignificant in the calculations herein. Therefore, the receiver 105 accurately computes the position of the pen 130. Those skilled in the relevant art will recognize that an appropriate error term may be incorporated into the equations described herein to compensate for this distance if necessary in a given application.

Figure 20:
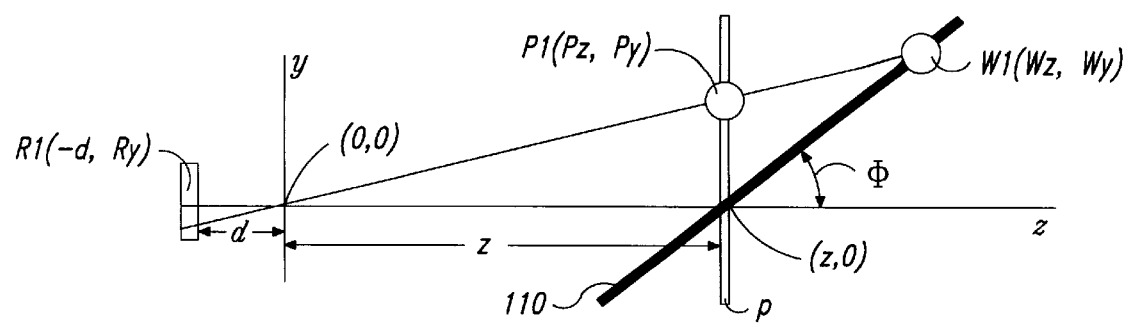
FIG. 20 is a side view of FIG. 18, with a y-z coordinate system shown thereon.

In FIG. 20, point W1 has coordinates (Wz, Wy). A ray of light from the LED 140 at point W1, as it travels through the focus of the lens 295, intersects plane P at the point P1 having coordinates (Pz, Py), and impinges on the PSD 255 at a point R1 having coordinates (−d, Ry). The intersection between the working surface area W and the projection plane P is the point (Z, 0) on the Z axis.

Using simple geometry, the depicted coordinate system reveals the following formulas for determining the Z and Y coordinates of the point W1:

$$W_z = \frac{Z\tan(\phi)}{\tan(\phi) - Py/Z} \quad (4)$$

$$W_y = PyWz/Z \quad (5)$$

where Pz=Z and $$P_y = \frac{-ZRy}{d}.$$

Therefore, given the position of point R1 (−d, Ry) measured by the PSD, and given the angle θ, the position of point W1 may be found from the above equations.

Figure 21:
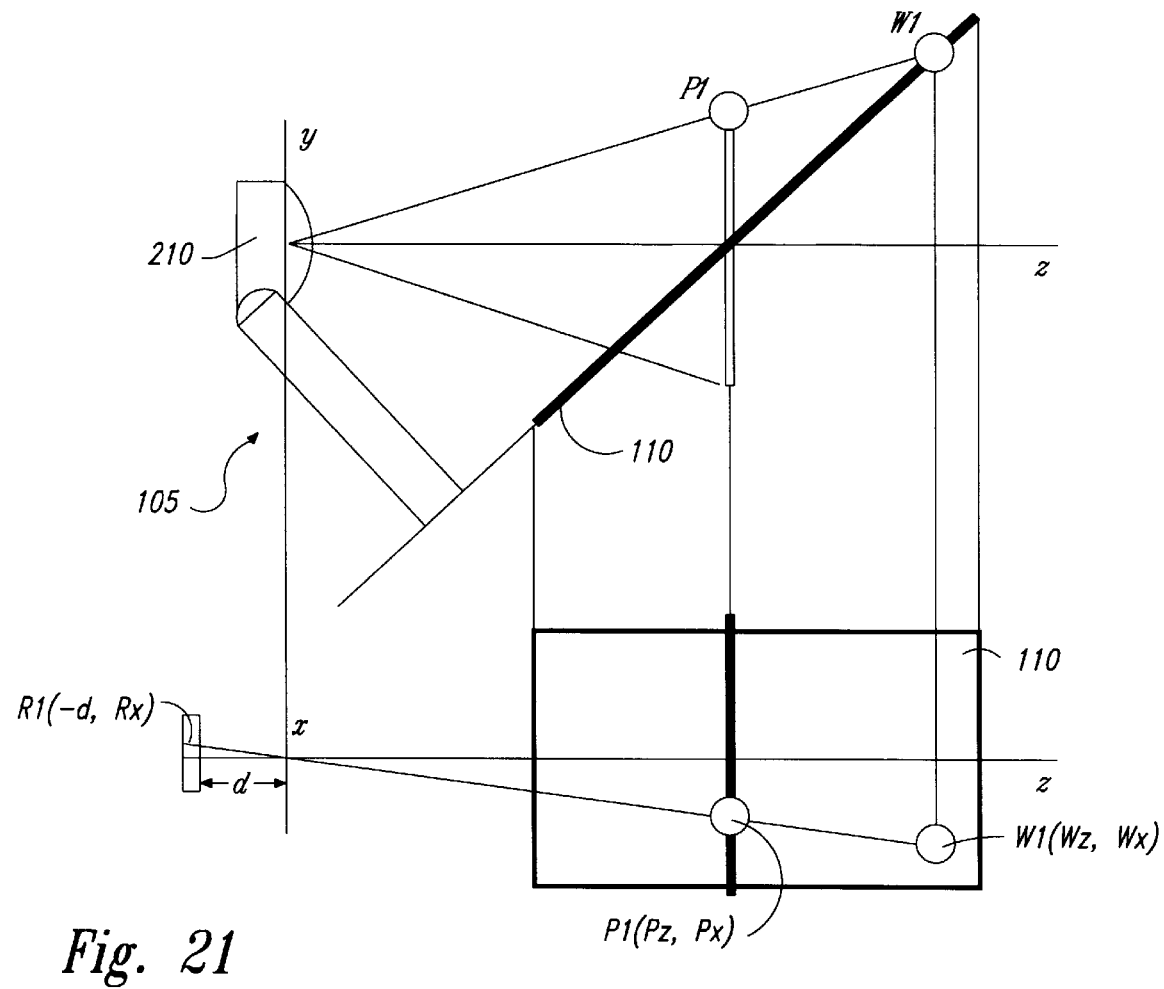
FIG. 21 is a top view of FIG. 19, with an x-z coordinate system shown thereon, and showing the 90° rotation from FIG. 19.

Considering now points in the z-x plane, FIG. 21 shows the point W1 having coordinates (Wz, Wx) intersecting the plane P at the point P1 having coordinates (Pz, Px). The point R1 on the PSD 255 has coordinates (−d, Rx). Using simple geometry, the coordinates of the point W1 in the z-x plane are computed based on the following formula:

$$Wx = Wz(Px/Pz) \quad (6)$$

Since Pz equals Z, the equation becomes Wx=Wz(Px/Z). Summarizing, given the position of the point R1 measured by the PSD 255 and the value of the angle θ, the position of a point W1 anywhere in the active area on the work surface may be computed using the above equations.

For a receiver using two one-dimensional PSDs, shown in FIG. 10, simple geometry yields equations similar to those set forth above. As with two-dimensional PSDs, a one-dimensional PSD outputs two currents signals indicating the exact position of a light spot impinging on the PSD. The X or Y positions on the one-dimensional PSD are computed based on the following equation:

$$Rx \text{ or } Ry = \frac{I2}{I1+I2} L \qquad (7)$$

where L is the length of the active area of the PSD and I1 and I2 are the currents output by the two terminals of the PSD.

In the second alternative embodiment described above and shown in FIG. 10, the two one-dimensional PSDs 285 and 285' are sufficiently close together to allow the above equations to be used without significant error. The PSD 285 outputs the position signal Ry, while the PSD 285' outputs the position signal Rx.

The above equations may be extended to compute the three-dimensional coordinates of the LED 140 using the fourth alternative embodiment shown in FIG. 12. The X and Y positions of the pen 130 are computed using the above formulas based on the outputs from the PSDs 285 and 285'. Simple geometry allows the Z position of the pen to be computed by triangulation, using the outputs from the PSDs 285 and 285".

FIG. 22 shows a receiver using two one-dimensional PSDs similar to the third alternative embodiment shown in FIG. 11, but which provides a simpler method of computing the pen's coordinates. Computations for this system will be discussed first; computations for the third alternative embodiment will be discussed thereafter. In FIG. 22, the centers of the two apertured plates 290 and 290', and the PSDs 285 and 285' behind them, are separated from each other by a distance D and the PSDs are each separated from apertured plates by a distance d. The LED 140 of the pen 130 is located on the work surface at a point W1 having coordinates (Wx, Wy). The PSDs 285 and 285' have an active area L in length. Light from the LED 140 at the point W1 is focused to a spot on the PSD 285 at a distance Y1 from the top edge of the PSD (as shown in FIG. 22). This light spot is at a distance Y1–L/2 from the midpoint of the PSD 285. Similarly, light from the LED 140 is focused to a light spot on the PSD 285 at a distance Y2 from the top edge of this PSD. This light spot is at a distance Y2–L/2 from the midpoint of the PSD 285'.

From simple geometry and algebra, the position of the spot W1 may be computed from the following equations:

$$Wx = \frac{Dd}{Y_2 - Y_1} \qquad (8)$$

$$Wy = \frac{Wx[Y_1 - (L/2)]D}{Y_2 - Y_1} \qquad (9)$$

where the values L, D, and d are known, and the PSDs 285 and 285' output signals representing the values $Y_1$ and $Y_2$, respectively.

FIG. 23 shows the third alternative embodiment as shown in FIG. 11 using two one-dimensional PSDs angled towards each other. Reference lines 1 and 2 extend perpendicularly from PSDs 285' and 285, respectively, and through plates 290' and 290, respectively. Lines 1 and 2 intersect at the point C having coordinates (a, 0). At point C on the work surface 110, the LED 140 projects rays of light along Lines 1 and 2 onto the center of the PSDs 285 and 285'. The equation for Line 1 is:

$$Y = \left(\frac{D}{2a}\right)X - \frac{D}{2} \qquad (10)$$

The equation for Line 2 is:

$$Y = \left(\frac{-D}{2a}\right)X + \frac{D}{2} \qquad (11)$$

At point W1 on the work surface 110, the LED 140 has coordinates (Wx, Wy). The LED 140 projects rays of light along Line 3 onto the PSD 285' and along Line 4 onto the PSD 285. Light transversing Line 3 casts a spot on the PSD 285 at a distance Z2 from the midpoint of the PSD. Similarly, light following Line 4 casts a spot a distance Z1 from the center of the PSD 285. The equation for Line 3 is:

$$Y - Wy = \left[\frac{Wy + (D/2)}{Wx}\right]X - \frac{D}{2} \qquad (12)$$

and the equation for Line 4 is:

$$Y - Wy = \left[\frac{Wy + (D/2)}{Wx}\right]X + \frac{D}{2} \qquad (13)$$

The PSDs 285 and 285' output signals indicating the values Z1 and Z2, respectively. Lines 2 and 4 are separated by an angle A1; likewise, lines 1 and 3 are separated by an angle A2. Based on this relationship, the following equations result:

$$\tan(A1) = \frac{Z1}{d} \qquad (14)$$

$$\tan(A2) = \frac{Z2}{d} \qquad (15)$$

Simple algebra reveals that the X and Y coordinates of the point W1 may be computed based on the following equations:

$$Wy = \left(\frac{K1 + K2}{K2 - K1}\right)\left(\frac{-D}{2}\right) \qquad (16)$$

and $Wx = Kz[(Wy + (D/2))]$ \qquad (17)

where $K1 = \left[\frac{ad + (D/2)Z1}{aZ1 - d(D/2)}\right]$, $K2 = \left[\frac{ad - Z2(D/2)}{aZ2 + d(D/2)}\right]$ In the first alternative embodiment shown in FIG. 9, the quad photodiode 277 replaces the two-dimensional PSD 255. To calculate the position coordinates of the LED 140 using the quad photodiode 277, the following three constants are first be determined:

(i) Optical coefficient c: a coefficient derived from the shape of the aperture 270 (i.e., the shape and size of the opening) and the distance d between the surface of the quad photodiode 277 and the outer plane of the aperture 270. The coefficient c may be derived from graphing the output ratio of the quad photodiode against movements of the LED 140 in the x-direction distance. These measurements are determined for several distances H of the quad photodiode 277 from the work surface 110. The average slope of the lines produced in the graphs determine the value of the coefficient c. Tests have shown that the smallest standard deviation was found with an optical receiver 220 using a square shaped aperture 270 and no lens 295. Having computed the optical coefficient c in the x-direction, and by using a square aperture 270, the coefficient c is identical for measurements and calculations in the Y-direction.

(ii) Angle of the quad photodiode θ: because the receiver 105 is placed at the edge of the work surface, the optical receiver 220 is angled slightly down towards the work surface.

(iii) Distance between the quad photodiode and the work surface H: the receiver 105 places the quad photodiode 277 a selected height over the work surface.

Figure 24:
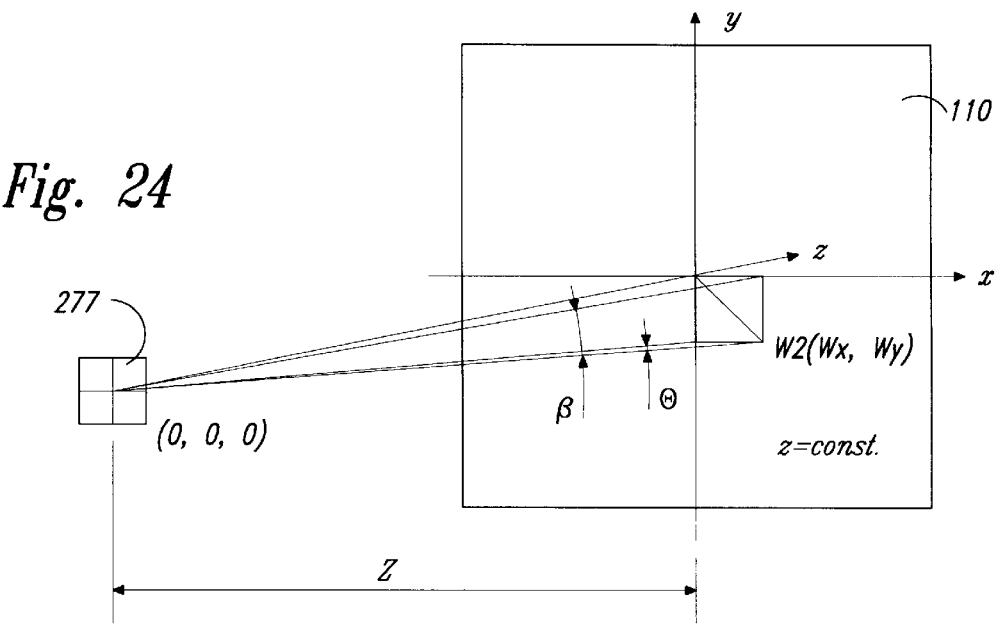
FIG. 24 is a schematic view of a first alternative embodiment of the optical receiver oriented in the presentation mode, with an x-y-z coordinate system shown thereon.

FIG. 24 illustrates a coordinate system useful in calculating position coordinates under the first alternative embodiment of the present invention when the receiver 105 is in the presentation mode. The LED 140 is located on the work surface 110 at a point W2 having coordinates (Wx, Wy). The following two equations are derived from the coordinate system shown.

$$Wx = \tan \alpha \cdot H \quad (18)$$

$$Wy = \tan \beta \cdot H \quad (19)$$

Since the Z-direction distance is constant (i.e., H), the x-direction and y-direction distances may be derived from a ratio of the current signals output by the four quadrants of the quad photodiode 277. Specifically, the coordinates of the LED 140 are computed based on the following equations:

$$\frac{Wx}{Z} = \tan\alpha = \frac{Rx}{c}, \text{ where} \quad (20)$$

$$Rx = \frac{(A+D) - (B+C)}{(A+D) + (B+C)}, \text{ and}$$

$$\frac{Wy}{Z} = \tan\beta = \frac{Ry}{c}, \text{ where} \quad (21)$$

$$Ry = \frac{(A+B) - (C+D)}{(A+B) + (C+D)}, \text{ and}$$

where the values A through D are obtained from the four outputs of the quad photodiode.

Figure 25:
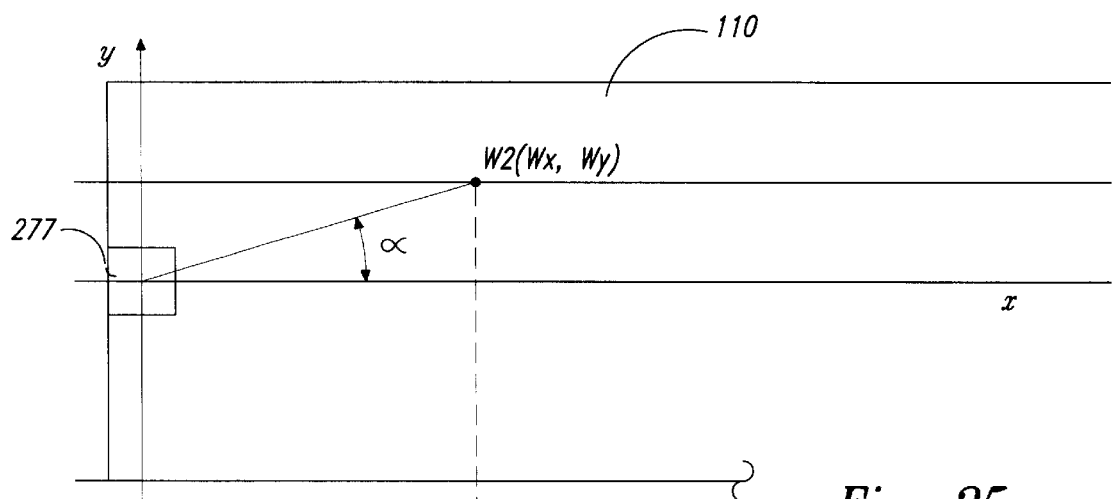
FIG. 25 is a schematic top view of the optical receiver of FIG. 24 oriented in a desktop mode, with an x-y coordinate system shown thereon.
Figure 26:
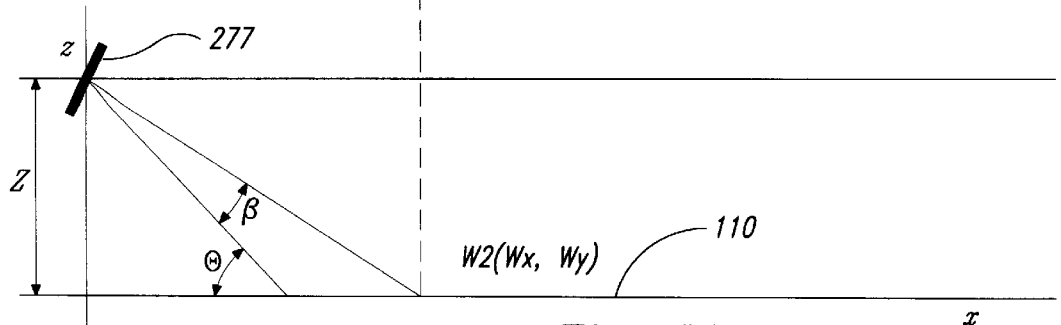
FIG. 26 is a side view of FIG. 25, with an x-z coordinate system shown thereon.

FIGS. 25 and 26 show a coordinate system for computing coordinates of the LED 140 when the quad photodiode 277 is in the desktop mode. From FIGS. 25 and 26, geometry yields the following equations:

$$Wx = (\tan\alpha)\left(\sqrt{H^2 + Wy^2}\right) \quad (22)$$

$$Wy = \tan[(\pi/2) - \theta + \beta] \quad (23)$$

H and θ are the height and angle, respectively, of the quad photodiode 277 over the work surface. The other two variables on the right hand side of the above equations, α and β, may be derived based on equations (20) and (21) above.

Based on the detailed description provided herein, those skilled in the relevant art will recognize that the present invention provides a wireless computer input device capable of a variety of computer input commands including cursor positioning, option selecting and other functions typical of mice and trackballs, while also providing inking, gesturing, and other detailed and accurate position inputs typical of pen and tablet devices. The present invention provides a wireless computer input system having both increased accuracy and lower manufacturing costs over prior systems. Additionally, the present invention provides a pen-type input device having low power consumption. Furthermore, the present invention offers both desktop and input modes, a feature apparently not found in the prior art.

Most of the components and elements described above are of a type generally known. Those skilled in the relevant art may select from any such components or elements which are suitable for use in the present invention. The present invention has been fully and concisely described above in terms of block diagrams and methods of computing coordinates, enabling those skilled in the relevant art to reproduce and use the present invention in various working forms. Additional information, while deemed unnecessary for making and using the invention, may be found in the U.S. patents and other references mentioned herein, all of which are incorporated herein by reference.

Although specific embodiments of, and examples for, the invention have been described for purposes of illustration, various modifications may be made without departing from the spirit and scope of the invention, as is known by those skilled in the relevant art. For example, the receiver 105 may be integrated into and located such that the optical receiver extends from the housing of the host computer 115 (as shown in FIG. 1), the visual display device 125, or the keyboard 127. The receiver 105 may not only be angularly adjustable (providing both desktop and presentation modes), but also be adjustable in height. Appropriate circuitry within the receiver 105 recognizes the selected height and makes appropriate adjustments to the coordinate computations. These and other changes may be made to the invention in light of the above-detailed description. Accordingly, the invention is not limited by the disclosure, but instead its scope is to be determined entirely by reference to the following claims.

We claim:

1. A wireless computer input system for a computer comprising:

a hand-held pen having a single light-emitting element capable of emitting light;

an optical receiver having a single light-detecting element, the receiver forming and detecting the light emitted by the single light-emitting element as a single incident light spot and producing simultaneously a plurality of output signals, wherein the plurality of output signals have a proportional relationship corresponding to the x-axis and y-axis positions of the single light-emitting element of the hand-held pen on a work surface; and a processing circuit coupled to the single light-detecting element and adapted to receive the plurality of output signals from the receiver and calculate x-axis and y-axis position coordinates corresponding to the two-dimensional position of the single light-emitting element on the work surface based on the position of the single light spot on the single light-detecting element.

2. The wireless computer input system according to claim 1 wherein the single light-detecting element is a position sensing device and wherein the output signals includes x and y position signals.

3. The wireless computer input system according to claim 2 wherein the optical receiver further includes an optical filter and an apertured plate positioned between the pen and the single light-detecting element.

4. The wireless computer input system according to claim 3 wherein the optical receiver includes a frame for fixedly holding the single light-detecting element and the apertured plate, the frame composed of a material capable of eliminating noise.

5. The wireless computer input system according to claim 2, further comprising a housing for supporting and selectively positioning the optical receiver in a first position wherein the optical receiver is positioned at a selected height from a surface and at a first selected angle toward the surface, and wherein the processing circuit is adapted to calculate coordinates on the basis of the selected height and the first selected angle with respect to the surface when the optical receiver is in the first position.

6. The wireless computer input system according to claim 5 wherein the first selected angle is approximately 45°.

7. The wireless computer input system according to claim 5 wherein the optical receiver can be selectively positioned in a second position wherein the optical receiver is positioned at a second selected angle from the surface.

8. The wireless computer input system according to claim 7 wherein the second selected angle is approximately 90°.

9. The wireless computer input system according to claim 1, further comprising a portable work surface adapted to selectably receive the optical receiver.

10. The wireless computer input system according to claim 9 wherein the portable work surface includes a flat panel display.

11. The wireless computer input system according to claim 1 wherein the pen includes a first switch adapted to cause the light-emitting element to emit the light, and the light-emitting element is adapted to emit the light in a fan-like dispersion.

12. The wireless computer input system according to claim 11 wherein the first switch is a motion-detecting switch and wherein the pen includes a second switch positioned at a tip of the pen.

13. The wireless computer input system according to claim 11 wherein the pen includes a housing, the first switch positioned within a recessed region on the housing, the recessed region adapted to receive the tip of a user's finger.

14. The wireless computer input system according to claim 1 wherein the pen includes a motion-detecting switch, a control circuit coupled to the motion-detecting switch and to the light-emitting element, and a power supply coupled to the control circuit, wherein the control circuit is adapted to produce data pulses, the data pulses modulated with the emitted light.

15. The wireless computer input system according to claim 14, further comprising a charging circuit coupled to the processing circuit and recharging contacts electrically coupled to the charging circuit, and a housing for receiving the optical receiver, the processing circuit and the charging circuit, the housing having a bore adapted to receive the pen and the recharging contacts located within the bore, wherein the power supply is a rechargeable power supply, and wherein the pen includes electrical contacts, the electrical contacts capable of electrically coupling with the recharging contacts when the pen is inserted in the bore for permitting the charging circuit to recharge the power supply.

16. The wireless computer input system according to claim 15, further comprising a cord electrically coupled to the charging circuit, the cord adapted to electrically couple with the electrical contacts so as to supply power to the pen when the power supply lacks sufficient power.

17. The wireless computer input system according to claim 1 wherein the processing circuit includes at least one analog to digital converter adapted to receive the output signal and produce a digital output signal, and a central processing unit adapted to receive the digital output signal and calculate position coordinates.

18. The wireless computer input system according to claim 17 wherein the processing circuit includes a filter circuit coupled to the single light-detecting element and a multiplexer circuit coupled in series between the filter circuit and the analog to digital converter.

19. The wireless computer input system according to claim 1 wherein the processing circuit includes at least one analog to digital converter adapted to receive the output signal and produce a digital signal, and a digital signal processing circuit adapted to receive the digital signal and calculate position coordinates.

20. The wireless computer input system according to claim 1 wherein the optical receiver is positioned within and extends without a housing of a visual display device.

21. The wireless computer input system according to claim 1, further comprising a housing for supporting and selectively positioning the optical receiver in a plurality of heights from a supporting surface upon which the housing rests, and wherein the processing circuit is adapted to coordinate on the basis of the selected plurality of heights.

22. The wireless computer input system according to claim 1 wherein the light-detecting element is a four division photodiode.

23. The wireless computer input system according to claim 1 wherein the processing circuit simultaneously processes the plurality of output signals from the receiver to calculate x-axis and y-axis position coordinates.

24. The wireless computer input system according to claim 1 wherein the processing circuit serially processes the plurality of output signals from the receiver to calculate x-axis and y-axis position coordinates.

25. A receiver for use in a wireless computer input system, wherein the computer input system provides signals to a computer having a display screen, and wherein the wireless computer input system includes an input device for producing light, and usable on a work surface, the receiver comprising:

an optical receiver having at least one light detecting element, the optical receiver receiving the produced light as at least one spot of light and generating signals in response to a position of the spot of light produced on the light-detecting element;

a frame positionable on the work surface and having a base portion and a portion extending vertically from the base portion, the vertically extending portion receiving the optical receiver, the frame supporting the light detecting element in position over the work surface and at an angle down toward the worksurface wherein the angle is neither 0° nor 90° with respect to the worksurface, wherein the vertically extending portion extends a distance, above the work surface, that is greater than a height of the optical receiver, and wherein the work surface differs from the display screen;

a filter circuit coupled to the optical receiver to filter the generated signals and produce a filtered signal;

an analog to digital converter coupled to the filter circuit to convert the filtered signal to a digital signal; and a processor circuit coupled to the analog to digital converter to convert the digital signal to a coordinate signal representing a two-dimensional position of the input device based on the position of the spot of light produced on the light-detecting element.

26. The receiver according to claim 25, further comprising a plurality of analog to digital converters coupled in parallel between the filter circuit and the processor circuit, and wherein the filter circuit includes a programmable gain amplifier.

27. The receiver according to claim 25 further comprising an amplifier coupled between the at least one light-detecting element and the filter circuit, and wherein the at least one light-detecting element is a position sensing device.

28. The receiver according to claim 25 wherein the optical receiver includes a plurality of light-detecting elements and a plurality of optical elements positioned between the light-detecting elements and the input device, the optical elements adapted to receive the light and produce spots of light on the plurality of light-detecting elements, the plurality of light-detecting elements capable of generating the signals in response to the received spots of light, and wherein the plurality of light-detecting elements are position-sensing devices.

29. The receiver according to claim 25 wherein the plurality of light-detecting elements are three position sensing devices, and the coordinate signal represents the three-dimensional position of the input device.

30. The receiver according to claim 28 wherein the frame is positionable at an edge of the work surface and supports and selectively positions the optical receiver in a first position wherein the optical receiver is positioned at a selected height over the work surface and at a first selected angle toward the work surface.

31. The receiver according to claim 30 wherein the optical receiver is selectively positionable in a second position at a second selected angle away from the work surface.

32. In a wireless computer input system having a pen capable of emitting light, and a receiver adapted to receive the light and produce an output signal for a computer having a display screen, a method of computing the coordinates of the pen comprising:

emitting light by the pen from a single light-emitting element;

positioning a light-detecting element at a selected height above a work surface and at an angle down toward the worksurface, wherein the angle is neither 0° nor 90° with respect to the worksurface, wherein the selected height is greater than a height of the single light detecting element, and wherein the work surface differs from the display screen;

producing a light spot from the single light-emitting element whose point of incidence on the light detecting element corresponds to a two-dimensional position of the pen;

generating a digital signal corresponding to the two-dimensional position of the light spot on the light detecting element;

computing a coordinate signal corresponding to the digital signal; and outputting the coordinate signal to a computer.

33. The method according to claim 32 wherein the receiver is adapted to receive a data signal selectively produced by the pen, the method further comprising the steps of determining if the data signal is produced by the pen, and outputting the data signal to the computer.

34. The method according to claim 32 wherein the receiver is capable of being oriented in first and second positions, the method further comprising the step of determining whether the receiver is in the second position.

35. The method of claim 32, further comprising:

receiving, at the light-detecting element, the light spot from the single light-emitting element of the pen at an angle of incidence directed upwardly from the work surface.

36. The method of claim 32, further comprising:

receiving, at the light-detecting element, the light spot from the single light-emitting element of the pen as a non-horizontal ray of light, wherein the non-horizontal ray of light is non-horizontal with respect to the work surface.

37. A wireless computer input system for a computer comprising:

a hand-held pen having a single light-emitting element capable of emitting light;

an optical receiver having a light-detecting element, the receiver forming and detecting the light emitted by the light-emitting element as a single incident light spot and producing at a single sampling interval a plurality of output signals corresponding to a two-dimensional position of the single light spot on the light-detecting element; and a processing circuit coupled to the light-detecting element and adapted to receive the output signals from the receiver and calculate two-dimensional position coordinates corresponding to the two-dimensional position of the single light-emitting element on the work surface based on the two-dimensional position of the single light spot on the light-detecting element.

38. The wireless computer input system according to claim 37 wherein the light-detecting element is a single position sensing device and wherein the output signals includes x and y position signals.

39. The wireless computer input system according to claim 37 wherein the light-detecting element is a four-position photodiode.

40. The wireless computer input system according to claim 37 wherein the optical receiver further includes an optical filter and an apertured plate positioned between the pen and the light-detecting element.

41. The wireless computer input system according to claim 37, further comprising a housing for supporting and selectively positioning the optical receiver in a first position wherein the optical receiver is positioned at a selected height from a surface and at a first selected angle toward the surface, and wherein the processing circuit is adapted to calculate coordinates on the basis of the selected height and the first selected angle with respect to the surface when the optical receiver is in the first position.

42. The wireless computer input system according to claim 37, further comprising a portable work surface adapted to selectably receive the optical receiver.

43. The wireless computer input system according to claim 37 wherein the pen includes a first switch adapted to cause the light-emitting element to emit the light, and the light-emitting element is adapted to emit the light in a fan-like dispersion.

44. The wireless computer input system according to claim 37 wherein the first switch is a motion-detecting switch and wherein the pen includes a second switch positioned at a tip of the pen.

45. The wireless computer input system according to claim 37 wherein the pen includes a motion-detecting switch, a control circuit coupled to the motion-detecting switch and to the light-emitting element, and a power supply coupled to the control circuit, wherein the control circuit is adapted to produce data pulses, the data pulses modulated with the emitted light.

46. The wireless computer input system according to claim 37, further comprising a charging circuit coupled to the processing circuit and recharging contacts electrically coupled to the charging circuit, and a housing for receiving the optical receiver, the processing circuit and the charging circuit, the housing having a bore adapted to receive the pen and the recharging contacts located within the bore, wherein the power supply is a rechargeable power supply, and wherein the pen includes electrical contacts, the electrical contacts capable of electrically coupling with the recharging contacts when the pen is inserted in the bore for permitting the charging circuit to recharge the power supply.

47. The wireless computer input system according to claim 37 wherein the optical receiver is positioned within and extends without a housing of a visual display device.

48. The wireless computer input system according to claim 37, further comprising a housing for supporting and selectively positioning the optical receiver in a plurality of heights from a supporting surface upon which the housing rests, and wherein the processing circuit is adapted to coordinate on the basis of the selected plurality of heights.

49. The wireless computer input system according to claim 37 wherein the processing circuit simultaneously processes the output signals from the receiver to calculate two-dimensional position coordinates.

50. The wireless computer input system according to claim 37 wherein the processing circuit serially processes the output signals from the receiver to calculate two-dimensional position coordinates.

\* \* \* \* \*